(12) United States Patent
Stroyer

(10) Patent No.: US 12,369,749 B2
(45) Date of Patent: Jul. 29, 2025

(54) GRILL HANDLE

(71) Applicant: Benjamin Stroyer, Webster, NY (US)

(72) Inventor: Benjamin Stroyer, Webster, NY (US)

( * ) Notice: Subject to any disclaimer, the term of this patent is extended or adjusted under 35 U.S.C. 154(b) by 470 days.

(21) Appl. No.: 17/233,697

(22) Filed: Apr. 19, 2021

(65) Prior Publication Data

US 2022/0007890 A1 Jan. 13, 2022

Related U.S. Application Data

(63) Continuation of application No. PCT/US2019/057210, filed on Oct. 21, 2019.

(60) Provisional application No. 62/748,495, filed on Oct. 21, 2018.

(51) Int. Cl.
*A47J 37/07* (2006.01)
*F24C 15/02* (2006.01)

(52) U.S. Cl.
CPC ......... *A47J 37/0786* (2013.01); *F24C 15/024* (2013.01)

(58) Field of Classification Search
CPC ............................ A47J 37/0786; F24C 15/024
See application file for complete search history.

(56) References Cited

U.S. PATENT DOCUMENTS

| | | | | |
|---|---|---|---|---|
| 2,811,915 A | * | 11/1957 | Sarkisian | A47J 37/041 99/421 HH |
| 3,693,534 A | * | 9/1972 | Martin | A47J 37/0713 99/421 H |
| 3,753,431 A | * | 8/1973 | Koziol | A47J 37/0713 126/38 |
| 4,192,283 A | | 3/1980 | Kridler et al. | |
| 4,453,529 A | * | 6/1984 | Spencer | A47J 37/0763 126/25 R |
| 4,469,599 A | | 9/1984 | Gros et al. | |
| 4,492,215 A | * | 1/1985 | DiGianvittorio | A47J 37/0704 248/165 |
| 4,598,693 A | * | 7/1986 | Koziol | A47J 37/0786 126/41 R |
| 4,662,349 A | | 5/1987 | McKenzie et al. | |
| 4,729,364 A | | 3/1988 | Dailey | |
| 4,741,321 A | * | 5/1988 | Squires | A47J 37/0713 126/41 R |
| 4,840,118 A | | 6/1989 | Rinehart | |
| 5,050,577 A | * | 9/1991 | Baynes | A47J 37/0713 126/41 R |
| 5,086,753 A | | 2/1992 | Berger | |

(Continued)

OTHER PUBLICATIONS

International Search Report and Written Opinion for PCT/US2019/57208 Jan. 17, 2020.

(Continued)

*Primary Examiner* — Michael G Hoang
*Assistant Examiner* — Logan P Jones
(74) *Attorney, Agent, or Firm* — Michael J. Nickerson

(57) ABSTRACT

A handle assembly for a grill hood for covering a firebox includes an extended grill handle having a face portion and an extended portion. The face portion is positioned to be parallel or perpendicular to a front edge of the grill hood and across a portion of a face or side of the grill hood. The grill hood may be any shape and the face is considered the opposite side from the hinge point. The extended portion extends beyond an outer boundary of the firebox.

4 Claims, 22 Drawing Sheets

(56) References Cited

U.S. PATENT DOCUMENTS

| | | | | |
|---|---|---|---|---|
| 5,088,069 | A | * | 2/1992 | Koziol .................... G04F 3/022 368/10 |
| 5,163,359 | A | * | 11/1992 | McLane, Sr. ....... A47J 37/0713 126/41 R |
| 5,483,947 | A | * | 1/1996 | Giebel ................ A47J 37/0704 126/41 R |
| 5,617,840 | A | | 4/1997 | Clifford |
| 5,865,101 | A | * | 2/1999 | Brown .................... A47J 36/38 99/410 |
| 5,988,334 | A | * | 11/1999 | Caruso ................. A45C 13/262 190/102 |
| 5,992,307 | A | | 11/1999 | Parker et al. |
| 6,039,039 | A | | 3/2000 | Pina, Jr. |
| 6,132,055 | A | * | 10/2000 | Grisamore .......... A47J 37/0704 362/253 |
| 6,935,327 | B1 | | 8/2005 | Williams et al. |
| 8,201,550 | B2 | | 6/2012 | Malumyan |
| 9,788,688 | B1 | | 10/2017 | Ficarra |
| 9,877,610 | B2 | | 1/2018 | Bucher et al. |
| 9,949,594 | B2 | | 4/2018 | May et al. |
| 10,010,217 | B1 | | 7/2018 | Miller |
| 2001/0032642 | A1 | | 10/2001 | Bach et al. |
| 2008/0117621 | A1 | * | 5/2008 | Lin ..................... A47J 37/0786 362/92 |
| 2008/0210214 | A1 | | 9/2008 | Wade |
| 2010/0225078 | A1 | * | 9/2010 | Bragg .................. B65F 1/1468 280/47.26 |
| 2010/0242942 | A1 | | 9/2010 | Chang |
| 2014/0090633 | A1 | * | 4/2014 | Gleaton .............. A47J 37/0786 126/213 |
| 2016/0106252 | A1 | * | 4/2016 | Baker .................. A47J 27/002 126/369 |
| 2016/0305669 | A1 | | 10/2016 | Sanquist |
| 2017/0086555 | A1 | * | 3/2017 | Rabinoff .............. A45C 13/262 |
| 2017/0105573 | A1 | * | 4/2017 | Atkisson ............. A47J 37/0786 |
| 2017/0238758 | A1 | * | 8/2017 | Rummel ............. A47J 37/0781 |

OTHER PUBLICATIONS

International Search Report and Written Opinion for PCT/US2019/057210 Jan. 17, 2020.

International Written Opinion for PCT/US2019/057210 Apr. 27, 2021.

* cited by examiner

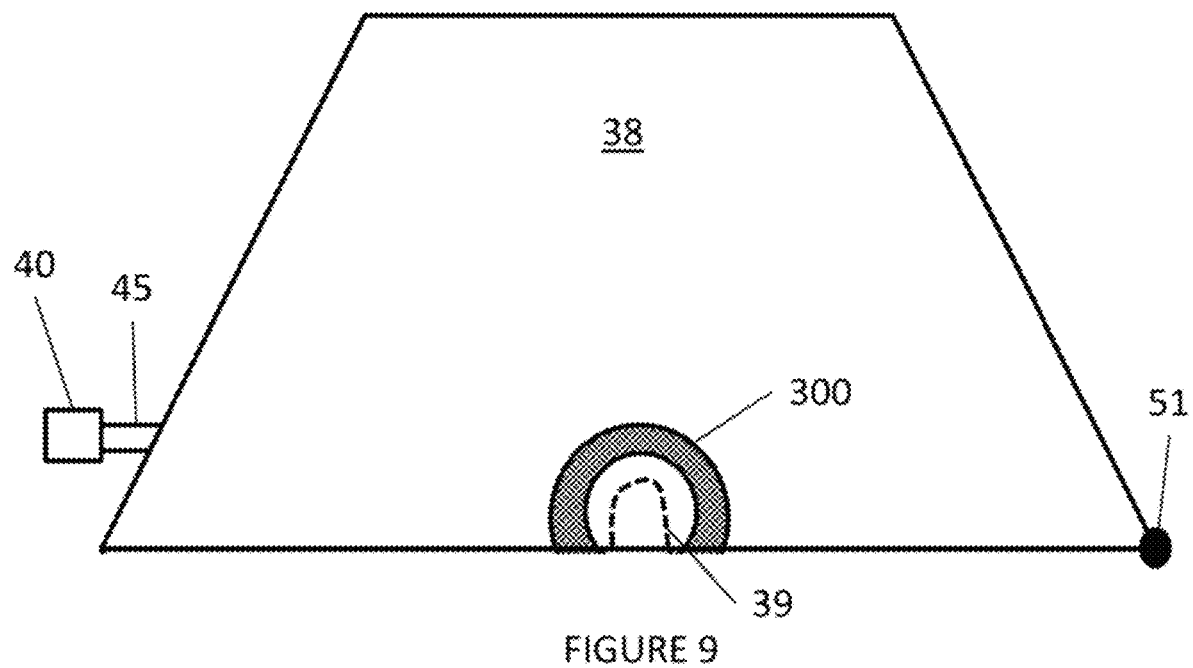
FIGURE 9
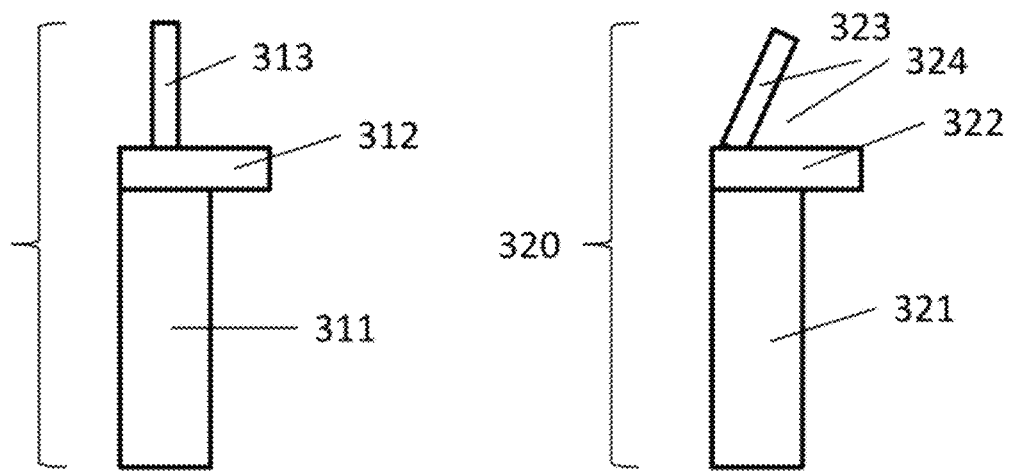
FIGURE 10
FIGURE 11

GRILL HANDLE

PRIORITY INFORMATION

The present application is a continuation application of PCT Patent Application Number PCT/US2019/057210, filed on Oct. 21, 2019, and claims priority, under 35 U.S.C. § 120, from PCT Patent Application Number PCT/US2019/057210, filed on Oct. 21, 2019. The entire content of PCT Patent Application Number PCT/US2019/057210, filed on Oct. 21, 2019, is hereby incorporated by reference.

PCT Patent Application Number PCT/US2019/057210, filed on Oct. 21, 2019, claims priority, under 35 U.S.C. § 119(e), from U.S. Provisional Patent Application, Ser. No. 62/748,495, filed on Oct. 21, 2018. The entire content of U.S. Provisional Patent Application, Ser. No. 62/748,495, filed on Oct. 21, 2018, is hereby incorporated by reference.

BACKGROUND

FIG. 1 illustrates a conventional grill assembly. As illustrated in FIG. 1, the grill assembly includes a firebox assembly 10, a pair of side tables 12 and 14, and a cart assembly that includes a front support assembly, a rear support assembly, a pair of feet 24, and a pair of wheels 26.

The firebox assembly 10 includes a firebox base (not shown) for the valves, burners and grills (not shown) typically employed for applying heat to food. As shown, the firebox base has burner control knobs 32 on a front panel 34. A base support (not shown) supports the firebox base on top of the cart assembly at approximately the waist level of a typical adult.

A grill hood 38 with a handle assembly 40 (substantially parallel to a front face of the grill hood 38) is provided for selectively covering and uncovering the firebox base. The grill hood is appropriately hinged or rotatably attached (at the rear edge of the firebox base—the rear edge being the edge opposite a front edge to which the front panel 34 is attached) to the firebox base to allow the grill hood 38 to be opened and closed, as is well known in the art.

One of the side tables 14 may also have a valve, burner and grill or the like (not shown), covered by a hinged lid 42, with a control knob 44 at the front.

The firebox assembly also comes with a hose assembly (not shown) for connecting a supply tank (not shown) to the valves and burners in the firebox base and to the valve and burner in the side table.

The front support assembly comprises a pair of legs 48 held in spaced-apart relationship by front panels 36 and 18. The front panels 36 and 18 serve both an aesthetic purpose and to add structural rigidity to the front support assembly. The front panels 36 and 18 are fastened by threaded fasteners to the legs 48 of the front support assembly, though the front panels 36 and 18 may be attached in any other suitable manner.

The rear assembly (not shown) includes a similar pair of legs (not shown) held in spaced-apart relationship by upper and lower cross-members (not shown). The upper and lower cross-members are spot-welded to the legs of the rear support assembly, though the cross-members can be attached in any other suitable manner.

FIG. 2 illustrates the conventional grill assembly of FIG. 1, wherein the grill hood 38 is in an open state. As illustrated in FIG. 2, the grill hood 38 is rotated, by the user engaging handle assembly 40, upon hinges or rotatable attachment mechanisms 51 to reach an open state, thereby allowing the user access to the firebox base 50 and any items that may be located upon grill 52.

The handle assembly 40 is connected to the a face of the grill hood 38 using projecting members 45 that maintain the handle assembly 40 at a predetermined distance from the face of the grill hood 38. The projecting members 45 project outward from the face of the grill hood 38 in a substantially orthogonal manner.

As further illustrated in FIG. 2, the opened firebox defines a width C that has a first outer periphery A and a second outer periphery B.

It is noted that the highest risk of serious burns occur when a user is engaged in activity that requires a portion of the user's body to cross over the width (C) of the firebox base 50, the width (C) of the firebox base 50 being defined as the area between the first outer periphery A and the second outer periphery B.

It is further noted that the risk of serious burns occurring to the user is minimal when a portion of the user's body crosses over the area outside of the width (C) of the firebox base 50, the area outside of the width (C) of the firebox base 50 being defined as the area not between the first outer periphery A and the second outer periphery B or the area, as illustrated in FIG. 2, left of the first outer periphery A and the area, as illustrated in FIG. 2, right of the second outer periphery B.

As noted above and illustrated in FIG. 1, most conventional grills have a handle for lifting a grill hood (cover), which is located on a face of the grill hood (cover) that is opposite of the face of the grill hood (cover), which is hinged (rotatably attached) to the lower portion (base) of a fire box.

A problem with a handle for lifting a grill hood (cover), which is located on a face of the grill hood, is that when a flame-up occurs within the firebox and the user (griller) desires to access the inside of the firebox to suppress the flame-up, the user (griller) is susceptible to serious or minor injuries (burns) because the arm or face of the user (griller) may travel across and above the width (C) of the firebox base 50, the width (C) of the firebox base 50 being defined, in FIG. 2, as the area between the first outer periphery A and the second outer periphery B, to effectively open the grill hood.

An additional problem with a handle for lifting a grill hood (cover), which is located on a face of the grill hood, when the user (griller) desires to access the inside of the firebox to check the food, turn the meat, or other action, the user (griller) is susceptible to excessive heat emanating from the firebox, wherein the excessive heat can cause serious or minor injuries (burns). Also, when the user (griller), using a handle for lifting a grill hood (cover) that is located on a face of the grill hood, desires to access the inside of the firebox to check the food, turn the meat, or other action, the user (griller) is susceptible to direct contact (the user's wrist or forearm) with the edge of the grill hood that is hot, thereby possibly causing serious or minor injuries (burns).

Therefore, it is desirable to provide a solution to reduce or substantially eliminate the user's (griller) risk of serious or minor injuries (burns) when the user (griller) desires access to the inside of the firebox to suppress a flame-up.

Additionally, it is desirable to provide a solution to reduce or substantially eliminate the user's (griller) risk of serious or minor injuries (burns) due to excessive heat emanating from the firebox when the user (griller) desires access to the inside of the firebox.

Also, it is desirable to provide a solution to reduce or substantially eliminate the user's (griller) risk of serious or minor injuries (burns) due to contact with the edge of the grill hood when the user (griller) desires access to the inside of the firebox.

Moreover, it is desirable to provide a solution to reduce or substantially eliminate the user's (griller) risk of serious or minor injuries (burns) when the user (griller) desires access to the inside of the firebox when the firebox is operational.

Furthermore, it is desirable to provide a solution, which is readily useable with an existing conventional grill, to reduce or substantially eliminate the user's (griller) risk of serious or minor injuries (burns) when the user (griller) desires access to the inside of the firebox.

In addition, it is desirable to provide a handle for lifting a grill hood that allows the user (griller) to lift the grill hood without forcing or requiring the arm of the user (griller) to travel across and above the firebox to effectively open the grill hood.

Lastly, it is desirable to provide an auxiliary handle, which is readily useable with an existing conventional grill, for lifting a grill hood that allows the user (griller) to lift the grill hood without forcing or requiring the arm of the user (griller) to travel across and above the firebox to effectively open the grill hood.

BRIEF DESCRIPTION OF THE DRAWINGS

The drawings are only for purposes of illustrating various embodiments and are not to be construed as limiting, wherein:

FIG. 9 illustrates another example of a grill hood and an auxiliary handle for lifting the grill hood;

FIG. 10 illustrates an auxiliary handle for grill hood of FIG. 9;

FIG. 11 illustrates another example of an auxiliary handle for grill hood of FIG. 9;

DETAILED DESCRIPTION

Figure 1:
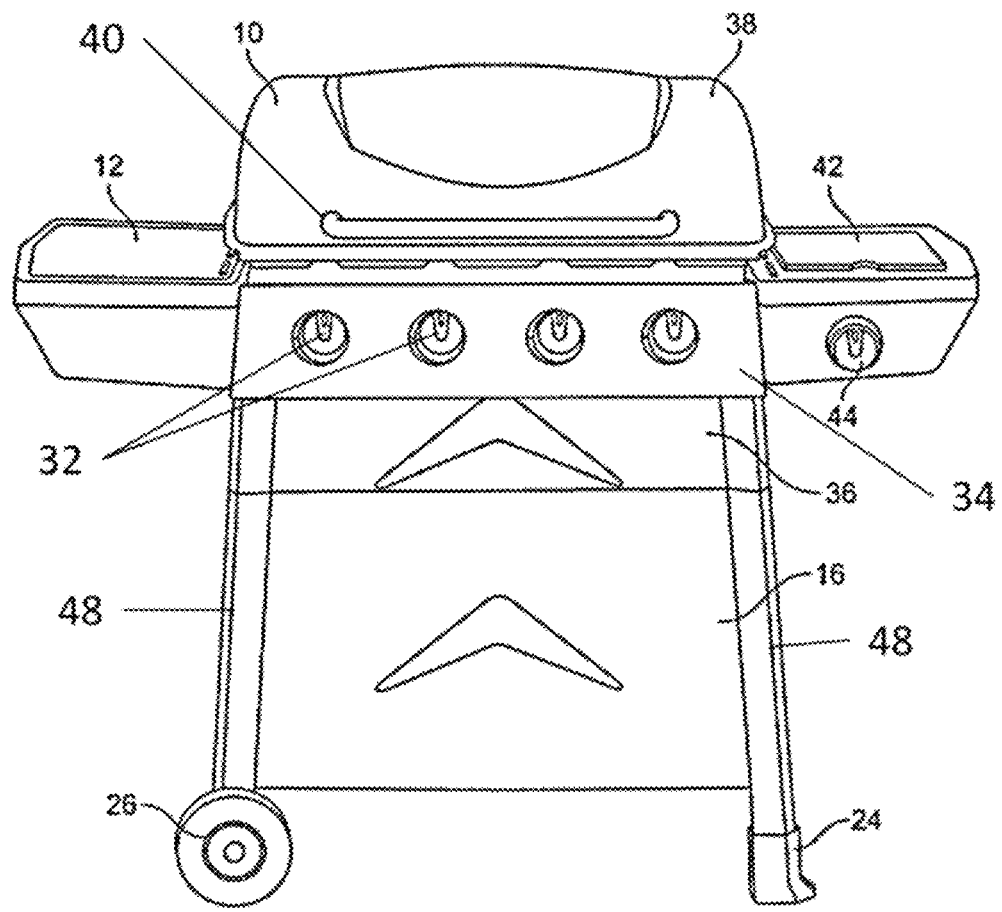
FIG. 1 illustrates a conventional grill assembly.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts may be properly illustrated.

Figure 3:
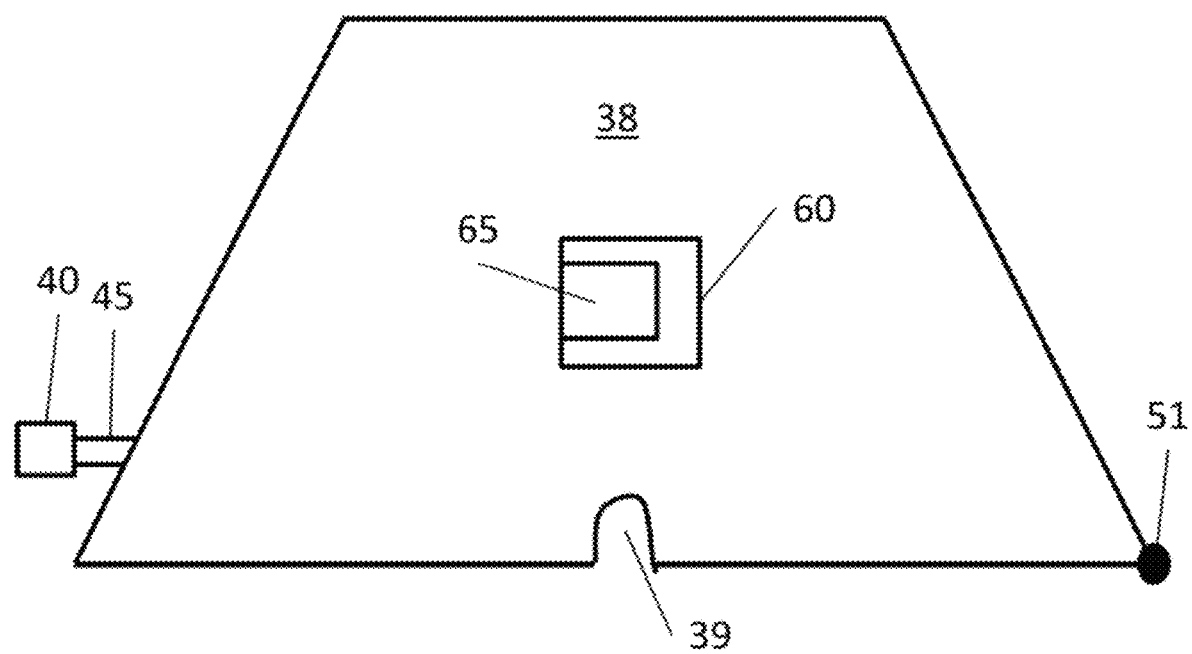
FIG. 3 illustrates a grill hood for use with an auxiliary handle for lifting a grill hood that allows the user to lift the grill hood without forcing or requiring the arm of the user to travel across and above the firebox to effectively open the grill hood.

FIG. 3 illustrates a grill hood for use with an auxiliary handle for lifting a grill hood that allows the user to lift the grill hood without forcing or requiring the arm of the user to travel across and above the firebox to effectively open the grill hood. As illustrated in FIG. 3, a grill hood 38 includes a handle 40 located on the unhinged side of the grill hood 38 (opposite of the hinged side, the side of the grill hood 38 with hinge 51 located thereon).

The handle assembly 40 is connected to a face of the grill hood 38 using projecting member 45 that maintains the handle assembly 40 at a predetermined distance from the face of the grill hood 38. The projecting member 45 projects outward from the face of the grill hood 38 in a substantially orthogonal manner.

The grill hood 38 also includes an opening 39 located at a bottom edge on each side of the grill hood 38, wherein each side of the grill hood 38 having the opening 39, is orthogonal to the unhinged side of the grill hood 38 and is orthogonal to the hinged side of the grill hood 38.

As further illustrated in FIG. 3, the grill hood 38 includes, on a side of the grill hood 38 having the opening 39, an auxiliary handle receiving member 60 is attached, as will be described in more detail below with respect to FIG. 5. The auxiliary handle receiving member 60 includes a channel 65 to receive a parallel gap member 120 of an auxiliary handle 100, as illustrated in FIG. 4.

The auxiliary handle receiving member 60 may be attached, in a permanent sense, to the side of the grill hood 38 with rivets and/or screws. On the other hand, the auxiliary handle receiving member 60 may include a permanent magnet to removably attach the auxiliary handle receiving member 60 to the side of the grill hood 38.

Alternatively, the auxiliary handle receiving member 60 may be welded to or be integrally formed in the side of the grill hood 38.

Figure 4:
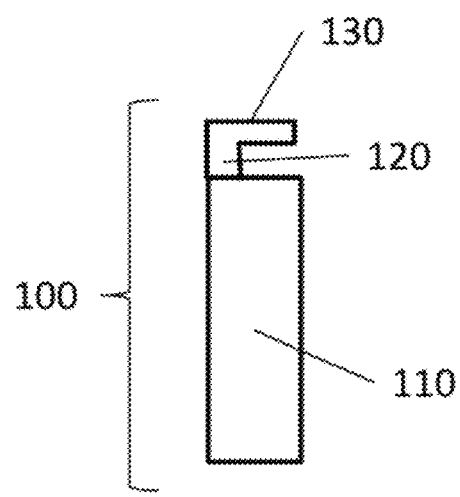
FIG. 4 shows an auxiliary handle for lifting the grill hood of FIG. 3.

FIG. 4 shows an auxiliary handle 100 for lifting the grill hood of FIG. 3. As illustrated in FIG. 4, the auxiliary handle 100 includes a handle member 110, parallel hook member 120, and an orthogonal hook member 130. The parallel hook member 120 and the orthogonal hook member 130, in conjunction with an end of the handle member 110, form a U-shaped hook that engages the auxiliary handle receiving member 60 of FIGS. 3 and 5.

Figure 5:
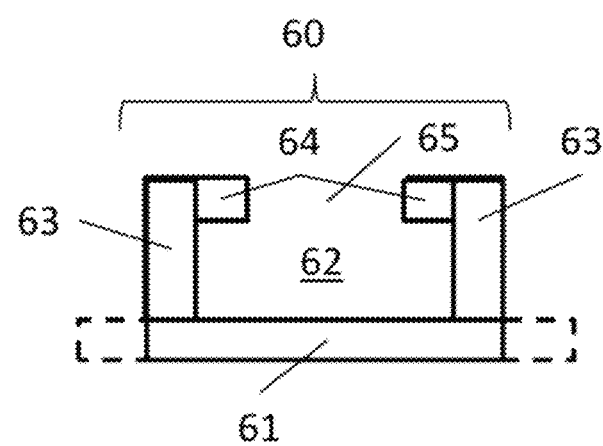
FIG. 5 shows a side view of an auxiliary handle receiving member on the grill hood of FIG. 3.

FIG. 5 shows a side view of an auxiliary handle receiving member on the grill hood of FIG. 3. As illustrated in FIG. 5, the auxiliary handle receiving member 60 includes an attachment member 61, parallel members 64, and orthogonal members 63. The attachment member 61, parallel members 64, and orthogonal members 63 form a U-shaped channel for receiving the U-shaped hook of the auxiliary handle 100. In addition, the parallel members 64 have an opening 65 located therebetween, wherein the opening 65 engages the parallel gap member 120 of the auxiliary handle 100.

The auxiliary handle receiving member 60 also includes a backstop member (not shown) that closes one end (end closest to a hinged side of the grill hood 38) of the U-shaped channel of the auxiliary handle receiving member 60.

Moreover, as illustrated in FIG. 5, the attachment member 61 may optionally extend beyond an outer boundary of the orthogonal members 63 to enable attachment using rivets and/or screws.

Figure 2:
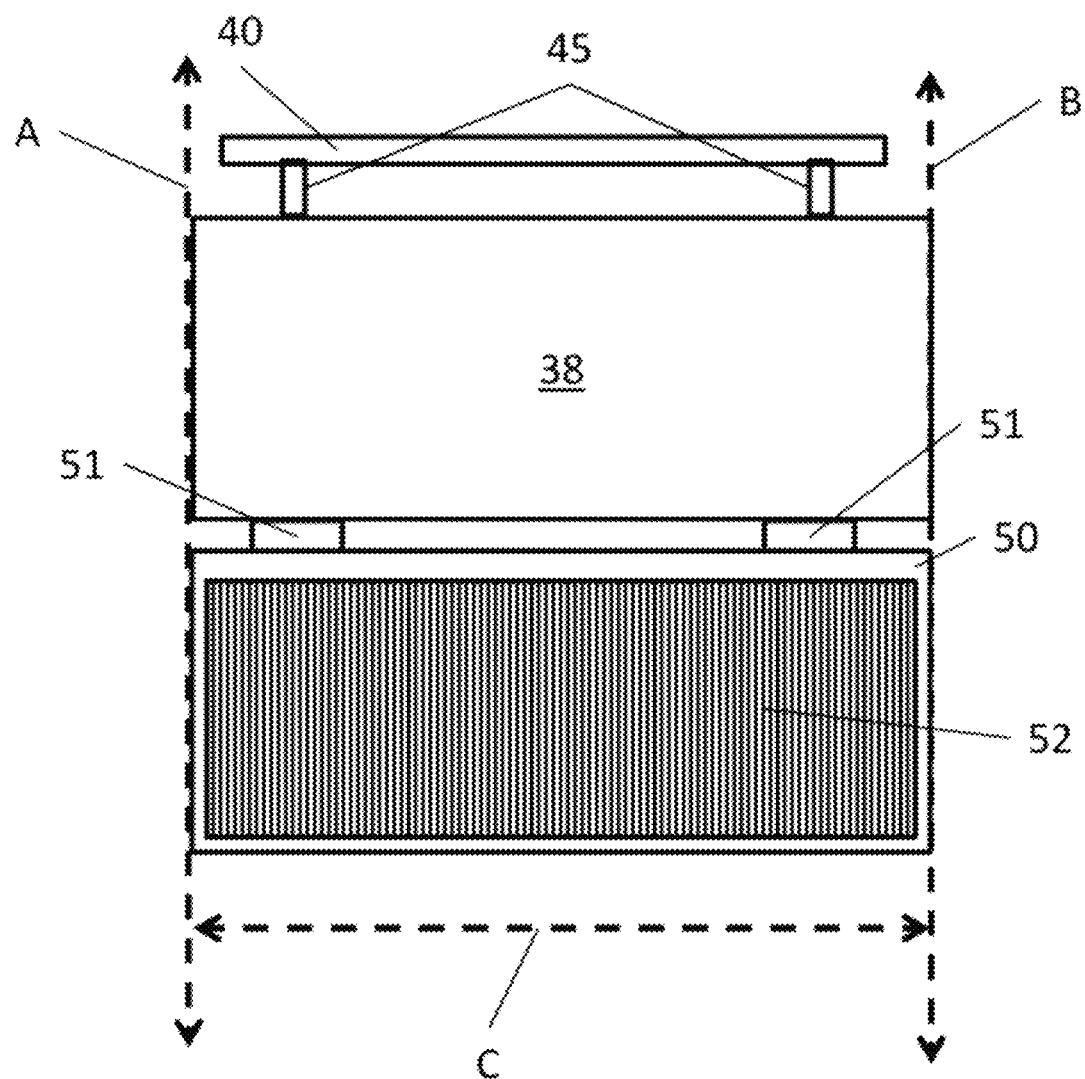
FIG. 2 illustrates the conventional grill assembly of FIG. 1 wherein the grill hood is in an open state.
Figure 6:
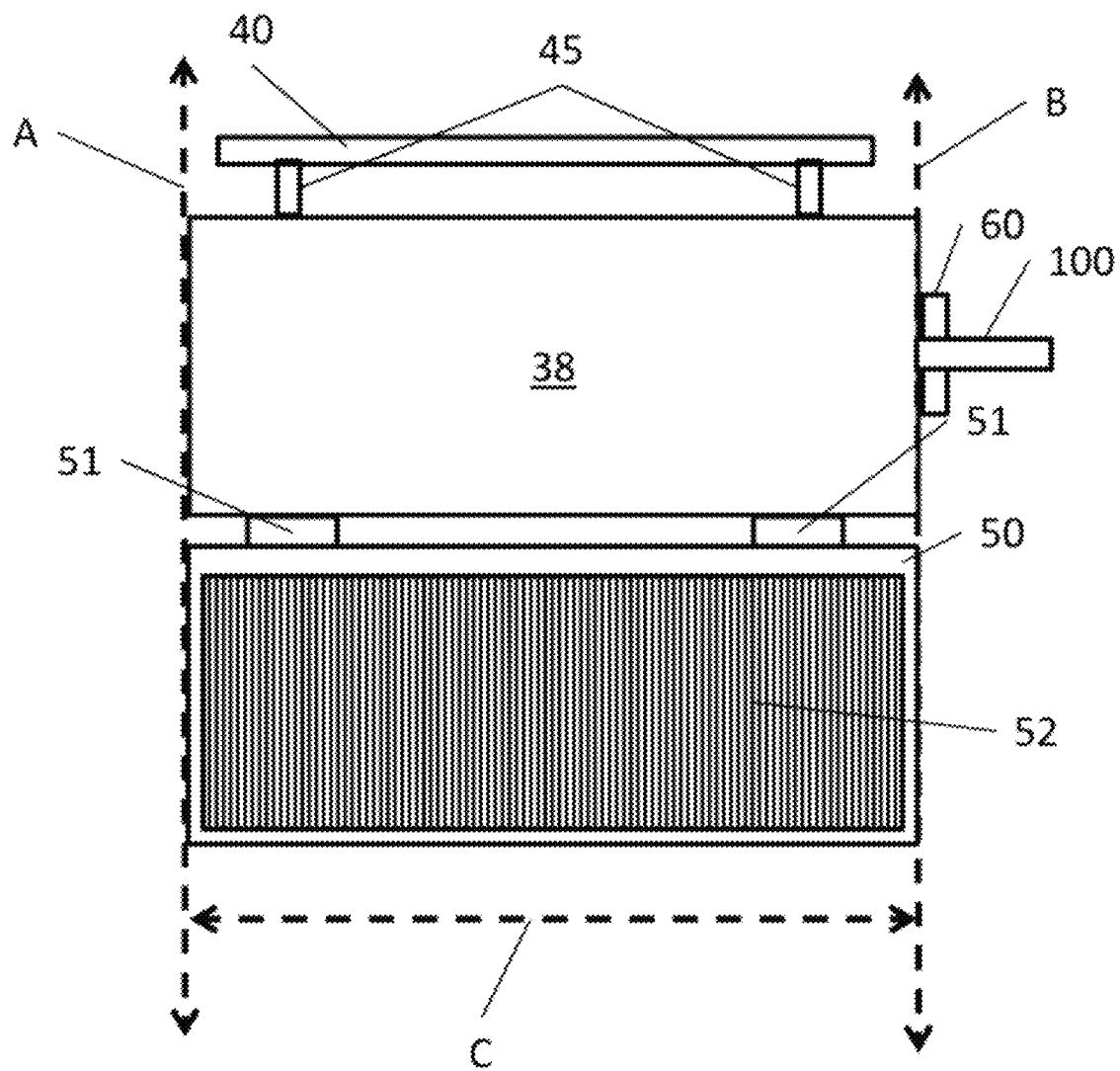
FIG. 6 shows the conventional grill hood (firebox) of FIG. 2 with the auxiliary handle of FIG. 4 engaged with the auxiliary handle receiving member of FIG. 5, wherein the grill hood is in an open state.

FIG. 6 shows the conventional grill hood (firebox) of FIG. 2 with the auxiliary handle assembly 100 of FIG. 4 engaged with the auxiliary handle receiving member 60 of FIG. 5, wherein the grill hood is in an open state. As illustrated in FIG. 6, the grill hood 38 is rotated, by the user engaging the auxiliary handle assembly 100, upon hinges or rotatable attachment mechanisms 51 to reach an open state, thereby allowing the user access to the firebox base 50 and any items that may be located upon grill 52.

As further illustrated in FIG. 6, the opened firebox defines a width C that has a first outer periphery A and a second outer periphery B.

It is noted that the highest risk of serious burns occur when a user is engaged in activity that requires a portion of the user's body to cross over the width (C) of the firebox base 50, the width (C) of the firebox base 50 being defined as the area between the first outer periphery A and the second outer periphery B.

However, since the user engages the auxiliary handle assembly 100, with respect to the embodiment of FIG. 6, the risk of serious burns is eliminated or substantially reduced because when a user is engaged in the opening (or closing) activity the user's body (or portions thereof) does not need to cross over the width (C) of the firebox base 50, the width (C) of the firebox base 50 being defined as the area between the first outer periphery A and the second outer periphery B, because the auxiliary handle assembly 100 is located outside the width (C) of the firebox base 50.

In other words, since the auxiliary handle assembly 100 is located in the area outside of the width (C) of the firebox base 50, being defined as the area not between the first outer periphery A and the second outer periphery B, when a user is engaged in the opening (or closing) activity the user's body (or portions thereof) does not need to cross over the width (C) of the firebox base 50.

Figure 7:
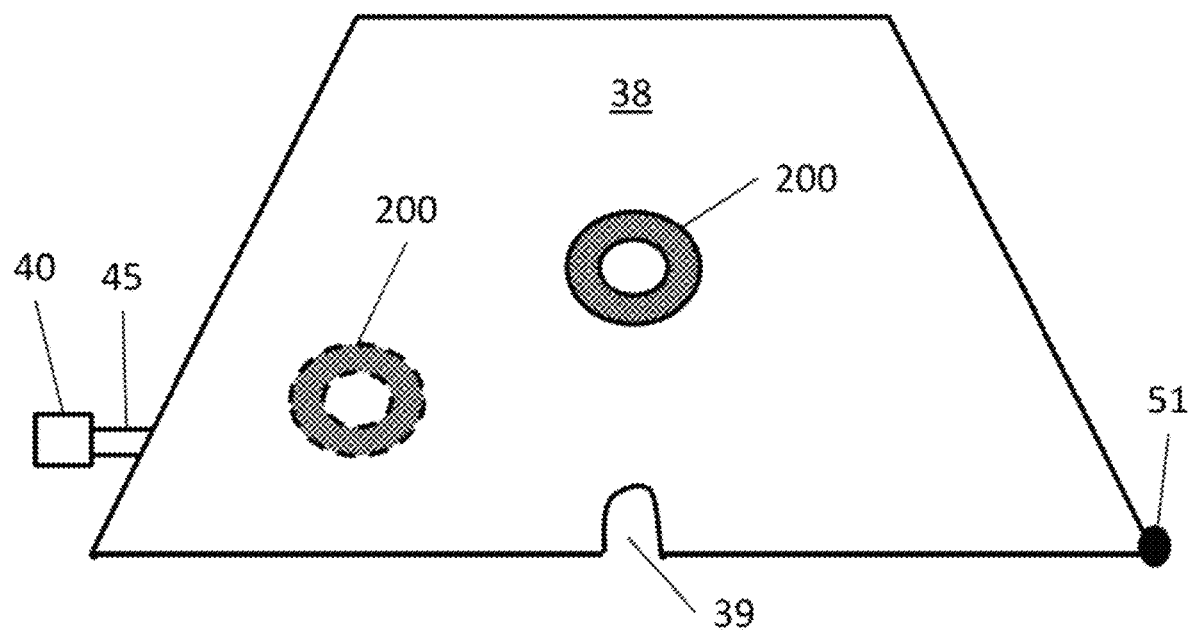
FIG. 7 illustrates a conventional grill hood and an auxiliary handle for lifting the grill hood.

FIG. 7 illustrates a grill hood and an auxiliary handle for lifting the grill hood. As illustrated in FIG. 7, a grill hood 38 includes a handle 40 located on the unhinged side of the grill hood 38 (opposite of the hinged side, the side of the grill hood 38 with hinge 51 located thereon). The grill hood 38 also includes an opening 39 located at a bottom edge on each side of the grill hood 38, wherein each side of the grill hood 38 having the opening 39, is orthogonal to the unhinged side of the grill hood 38 and is orthogonal to the hinged side of the grill hood 38. The handle assembly 40 is connected to a face of the grill hood 38 using projecting member 45 that maintains the handle assembly 40 at a predetermined distance from the face of the grill hood 38. The projecting member 45 projects outward from the face of the grill hood 38 in a substantially orthogonal manner.

As further illustrated in FIG. 7, the grill hood 38 includes, on a side of the grill hood 38 having the opening 39, an auxiliary handle assembly 200 is removably attached.

Figure 8:
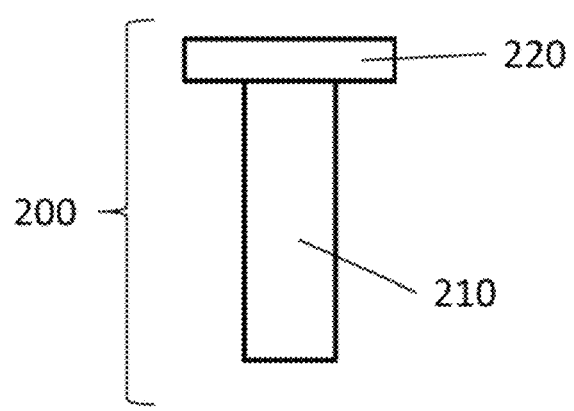
FIG. 8 illustrates the auxiliary handle of FIG. 7.

FIG. 8 illustrates the auxiliary handle assembly 200 of FIG. 7. As illustrated in FIG. 8, the auxiliary handle assembly 200 includes a handle member 210 and an orthogonal attachment member 220. The orthogonal attachment member 220 is a permanent magnet that allows the auxiliary handle assembly 200 to be removably attached to the side of the grill hood 38.

FIG. 9 illustrates another example of a grill hood and an auxiliary handle for lifting the grill hood. As illustrated in FIG. 9, a grill hood 38 includes a handle 40 located on the unhinged side of the grill hood 38 (opposite of the hinged side, the side of the grill hood 38 with hinge 51 located thereon). The grill hood 38 also includes an opening 39 located at a bottom edge on each side of the grill hood 38, wherein each side of the grill hood 38 having the opening 39, is orthogonal to the unhinged side of the grill hood 38 and is orthogonal to the hinged side of the grill hood 38.

The handle assembly 40 is connected to a face of the grill hood 38 using projecting member 45 that maintains the handle assembly 40 at a predetermined distance from the face of the grill hood 38. The projecting member 45 projects outward from the face of the grill hood 38 in a substantially orthogonal manner.

As further illustrated in FIG. 9, the grill hood 38 includes, on a side of the grill hood 38 having the opening 39, an auxiliary handle assembly 300 is removably attached.

FIG. 10 illustrates one embodiment of the auxiliary handle assembly for grill hood of FIG. 9. As illustrated in FIG. 10, the auxiliary handle assembly 310 includes a handle member 311, parallel stopping member 312, and an orthogonal lift member 313. The parallel stopping member 312 and orthogonal lift member 313 form an L-shaped hook that engages the opening 39 located at a bottom edge on each side of the grill hood 38. The orthogonal lift member 313 is inserted into the opening 39 located at the bottom edge on the side of the grill hood 38 such that the parallel stopping member 312 engages the side of the grill hood 38.

It is noted that the parallel stopping member 312 may be a permanent magnet to assist the engagement between the auxiliary handle assembly 310 and the side of the grill hood 38.

FIG. 11 illustrates another example of the auxiliary handle assembly for grill hood of FIG. 9. As illustrated in FIG. 11, the auxiliary handle assembly 320 includes a handle member 321, parallel stopping member 322, and an angled lift member 323. The parallel stopping member 322 and angled lift member 323 form a V-shaped hook that engages the opening 39 located at a bottom edge on each side of the grill hood 38. The angled lift member 323 is inserted into the opening 39 located at the bottom edge on the side of the grill hood 38 such that the parallel stopping member 322 engages the side of the grill hood 38.

It is noted that the parallel stopping member 322 may be a permanent magnet to assist the engagement between the auxiliary handle assembly 320 and the side of the grill hood 38.

Figure 12:
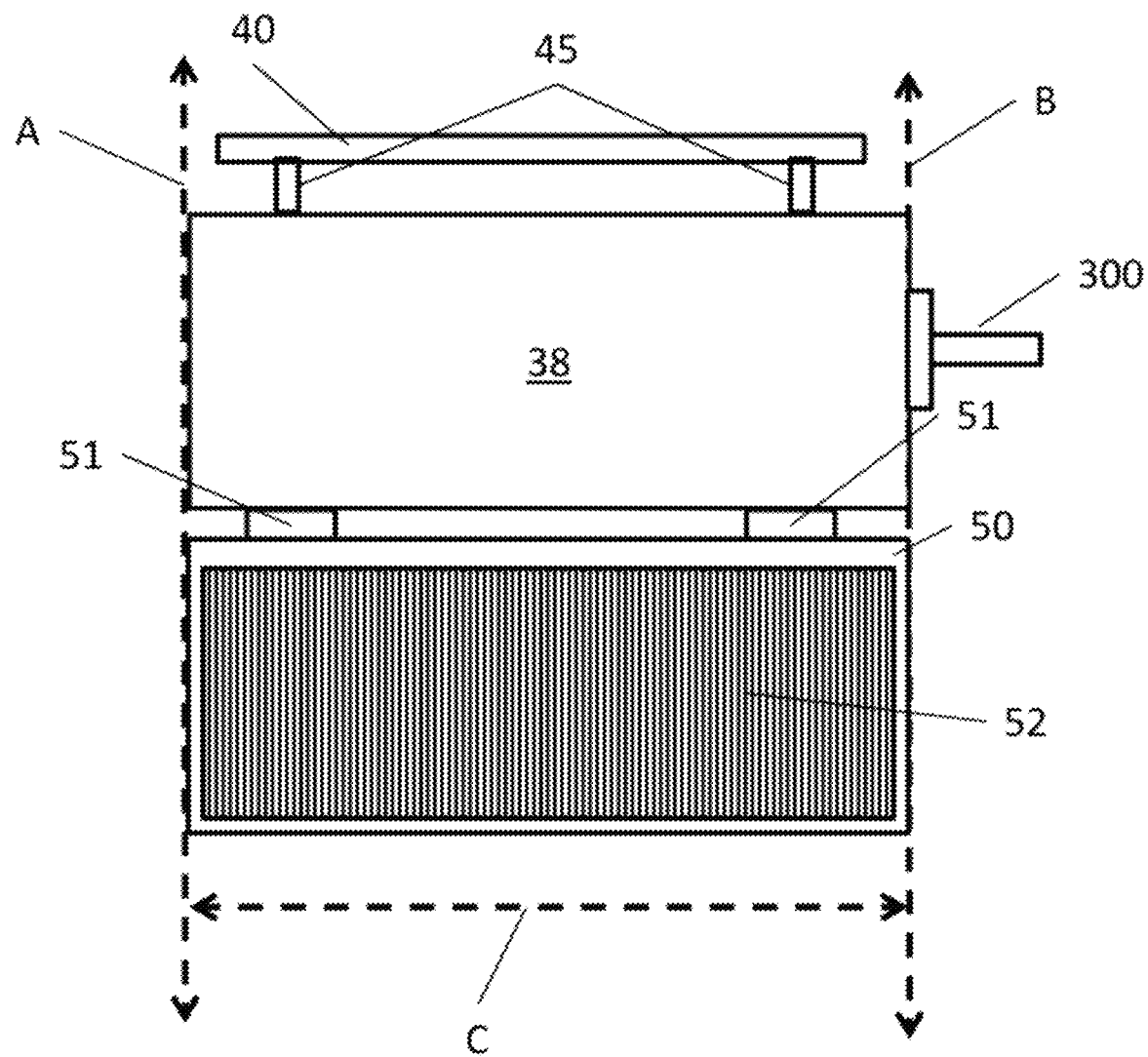
FIG. 12 shows the conventional grill hood (firebox) of FIG. 2 with the auxiliary handles of either FIG. 10 or FIG. 11 wherein the grill hood is in an open state.

FIG. 12 shows the conventional grill hood (firebox) of FIG. 2 with the auxiliary handles of either FIG. 10 or FIG. 11 wherein the grill hood is in an open state. As illustrated in FIG. 12, the grill hood 38 is rotated, by the user engaging the auxiliary handle assembly 300, upon hinges or rotatable attachment mechanisms 51 to reach an open state, thereby allowing the user access to the firebox base 50 and any items that may be located upon grill 52.

As further illustrated in FIG. 12, the opened firebox defines a width C that has a first outer periphery A and a second outer periphery B.

It is noted that the highest risk of serious burns occur when a user is engaged in activity that requires a portion of the user's body to cross over the width (C) of the firebox base 50, the width (C) of the firebox base 50 being defined as the area between the first outer periphery A and the second outer periphery B.

However, since the user engages the auxiliary handle assembly 300, with respect to the embodiment of FIG. 12, the risk of serious burns is eliminated or substantially reduced because when a user is engaged in the opening (or closing) activity the user's body (or portions thereof) does not need to cross over the width (C) of the firebox base 50, the width (C) of the firebox base 50 being defined as the area between the first outer periphery A and the second outer periphery B, because the auxiliary handle assembly 300 is located outside the width (C) of the firebox base 50.

In other words, since the auxiliary handle assembly 300 is located in the area outside of the width (C) of the firebox base 50, being defined as the area not between the first outer periphery A and the second outer periphery B, when a user is engaged in the opening (or closing) activity the user's body (or portions thereof) does not need to cross over the width (C) of the firebox base 50.

Figure 13:
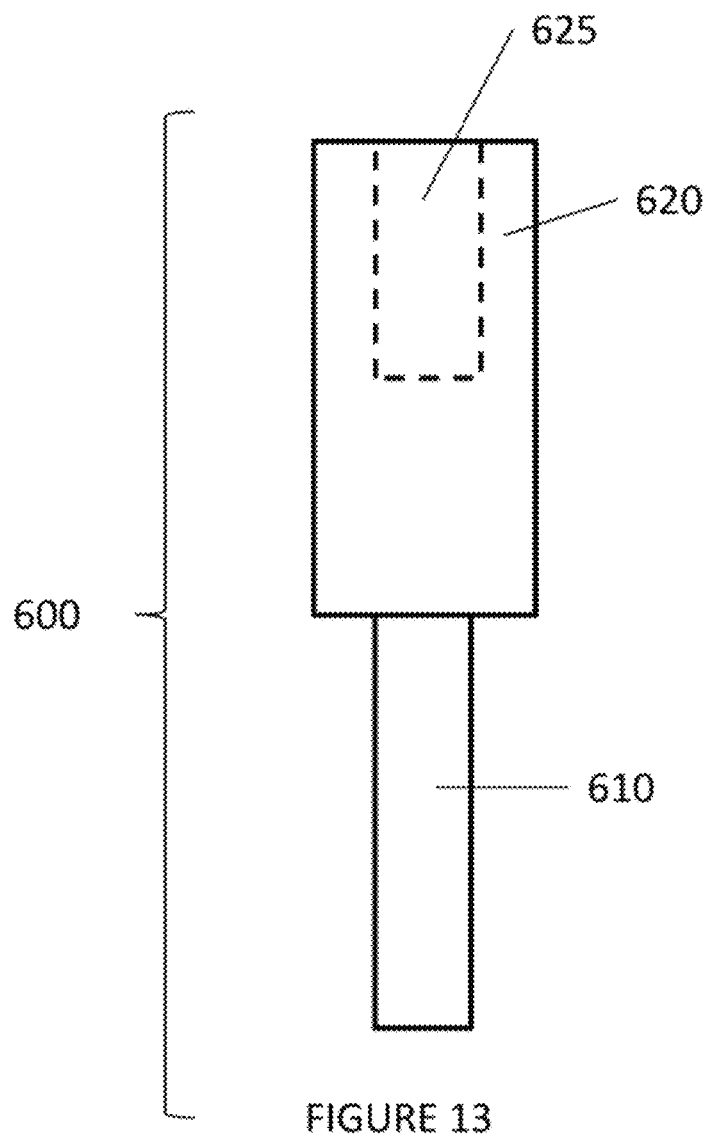
FIG. 13 illustrates an auxiliary handle for a conventional handle of a conventional grill hood.

FIG. 13 illustrates an auxiliary handle assembly for a conventional handle of a grill hood. As illustrated in FIG. 13, the auxiliary handle assembly 600 includes an auxiliary handle member 610, an auxiliary handle extension member 620, and an auxiliary handle extension channel 625.

The auxiliary handle extension channel 625 has a dimensional length so that the auxiliary handle member 610 enables the user to open the grill hood with having a portion of the user's body cross over the firebox area.

Figure 14:
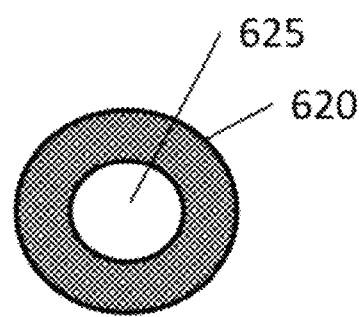
FIG. 14 shows a side view of the auxiliary handle of FIG. 13.

FIG. 14 shows a side view of the auxiliary handle assembly of FIG. 13. As illustrated in FIG. 14, the auxiliary handle extension channel 625 is a channel or cavity formed within the auxiliary handle extension member 620, wherein the auxiliary handle extension channel 625 has an opening, for receiving the handle of a conventional grill, located (as illustrated in FIG. 13) at an end of the auxiliary handle extension member 620 opposite the auxiliary handle member 610.

The auxiliary handle extension channel 625 may be dimensionally formed to match (receive) the shape of a specific conventional grill handle or may be dimensionally formed to effectively match (receive) the shapes of a multiple conventional grill handles.

Figure 15:
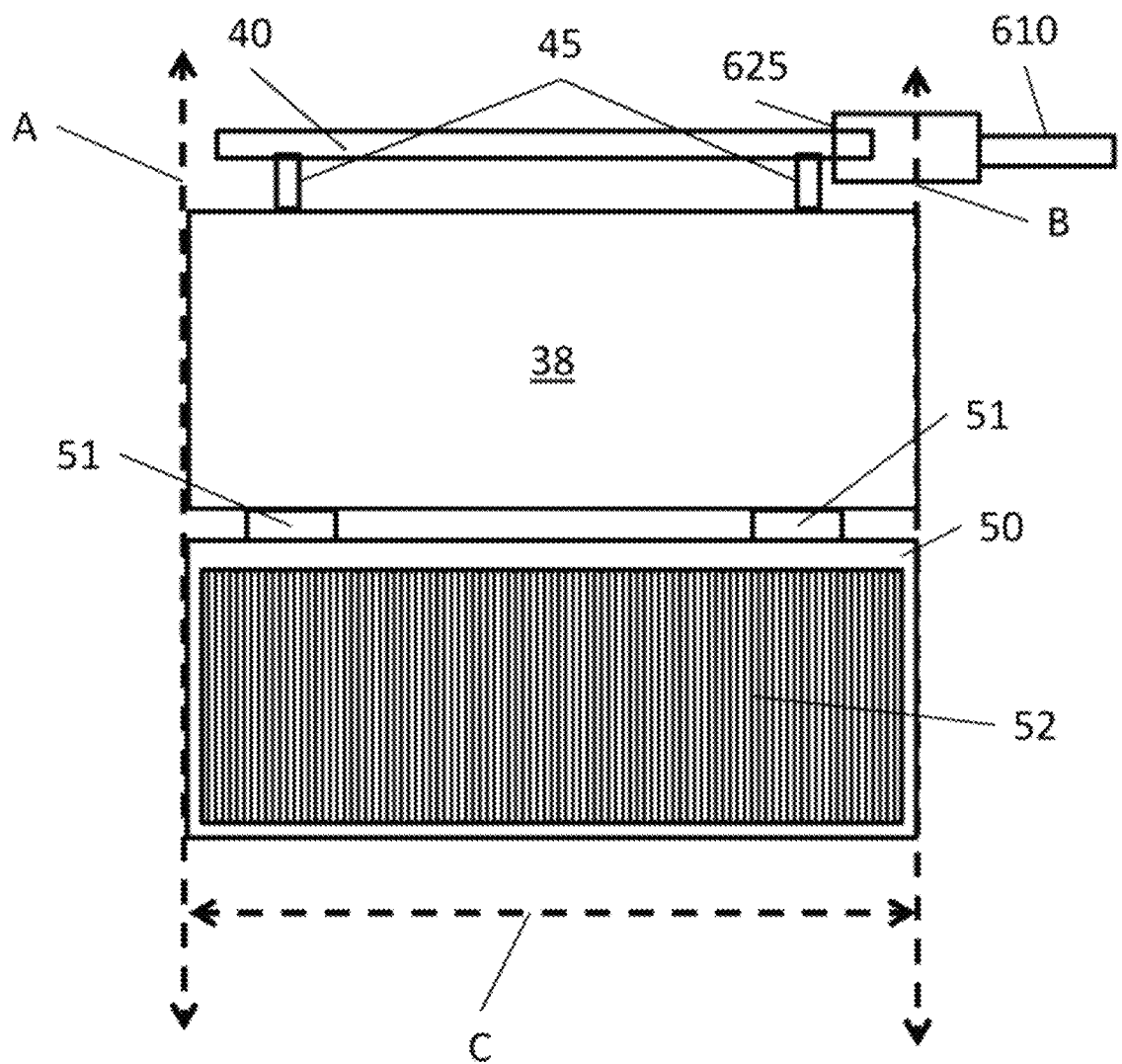
FIG. 15 shows a conventional grill hood (firebox) with the auxiliary handle of FIG. 2 wherein the grill hood is in an open state.

FIG. 15 shows the conventional grill hood (firebox) of FIG. 2 with the auxiliary handle assembly of FIG. 13, wherein the grill hood 38 is in an open state. As illustrated in FIG. 15, the grill hood 38 is rotated, by the user engaging the auxiliary handle member 610, upon hinges or rotatable attachment mechanisms 51 to reach an open state, thereby allowing the user access to the firebox base 50 and any items that may be located upon grill 52.

As further illustrated in FIG. 15, the opened firebox defines a width C that has a first outer periphery A and a second outer periphery B.

It is noted that the highest risk of serious burns occur when a user is engaged in activity that requires a portion of the user's body to cross over the width (C) of the firebox base 50, the width (C) of the firebox base 50 being defined as the area between the first outer periphery A and the second outer periphery B.

However, since the user engages the auxiliary handle member 610, with respect to the embodiment of FIG. 15, the risk of serious burns is eliminated or substantially reduced because when a user is engaged in the opening (or closing) activity the user's body (or portions thereof) does not need to cross over the width (C) of the firebox base 50, the width (C) of the firebox base 50 being defined as the area between the first outer periphery A and the second outer periphery B, because the auxiliary handle member 610 is located outside the width (C) of the firebox base 50.

In other words, since the auxiliary handle member 610 is located in the area outside of the width (C) of the firebox base 50, being defined as the area not between the first outer periphery A and the second outer periphery B, when a user is engaged in the opening (or closing) activity the user's body (or portions thereof) does not need to cross over the width (C) of the firebox base 50.

Figure 16:
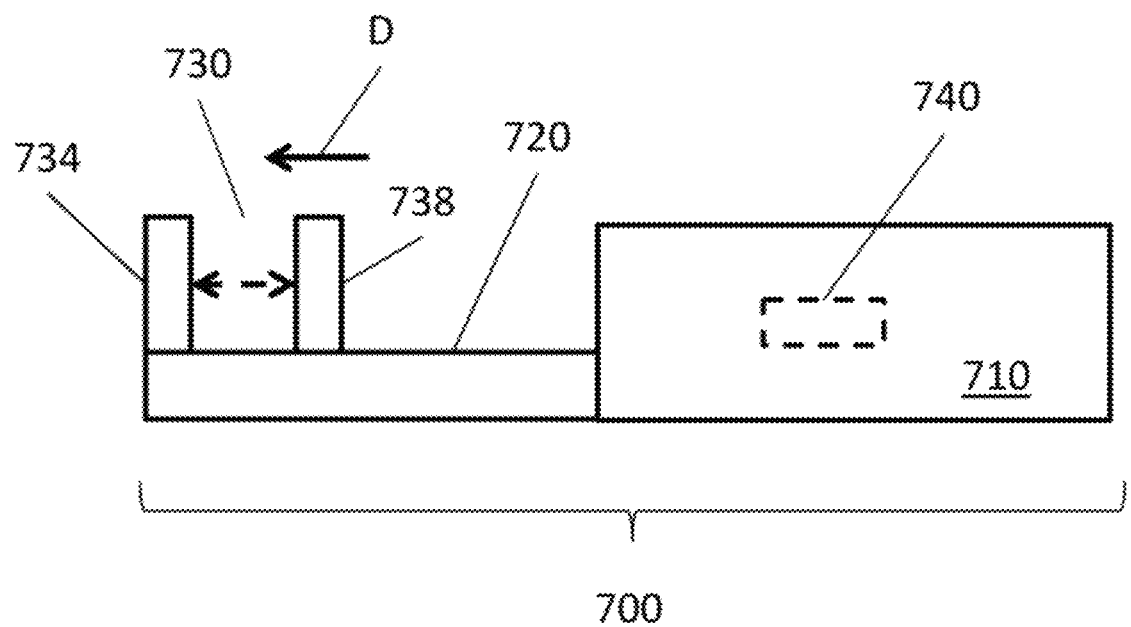
FIG. 16 illustrates another example of an auxiliary handle for a conventional handle of a grill hood.

FIG. 16 illustrates another example of an auxiliary handle for a conventional handle of a grill hood. As illustrated in FIG. 16, an auxiliary handle assembly 700 includes an auxiliary handle member 710, an auxiliary handle extension member 720, and an auxiliary handle gripping mechanism 730 composed of first orthogonal grip 734 and second orthogonal grip 738. The first orthogonal grip 734 and second orthogonal grip 738 are, relatively, biased towards each other.

For example, a position of the first orthogonal grip 734 may be static, and the position of the second orthogonal grip 738 may be dynamic such that the position of the second orthogonal grip 738 is biased (D) towards the position of the first orthogonal grip 734.

On the other hand, a position of the second orthogonal grip 738 may be static, and the position of the first orthogonal grip 734 may be dynamic such that the position of the first orthogonal grip 734 is biased towards the position of the second orthogonal grip 738. Lastly, a position of the first orthogonal grip 734 may be dynamic, and the position of the second orthogonal grip 738 may be dynamic such that the positions of the second orthogonal grip 738 and the position of the first orthogonal grip 734 are biased towards each other.

It is noted that the biased is strong enough to grip a conventional handle of a grill hood, but weak enough to allow a conventional handle to separate the first orthogonal grip 734 and second orthogonal grip 738 when the auxiliary handle assembly 700 is initially engages a conventional handle of a grill hood.

Optionally, the auxiliary handle member 710 may include a slide or toggle switch 740 that enables the user to separate the first orthogonal grip 734 and second orthogonal grip 738 so that the auxiliary handle assembly 700 can effectively engage a conventional handle of a grill hood.

Figure 17:
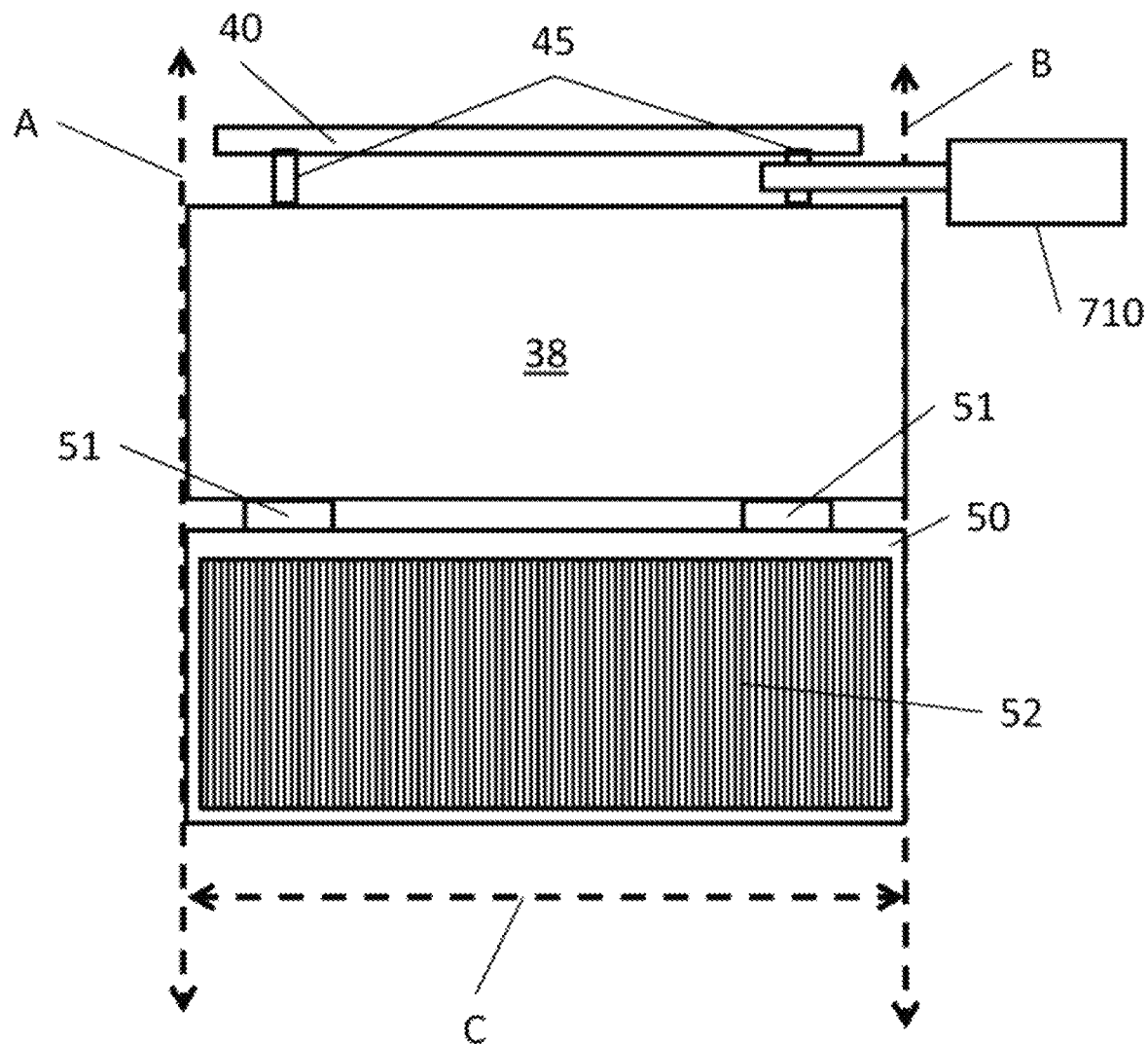
FIG. 17 shows a conventional grill hood (firebox) with the auxiliary handle of FIG. 2 wherein the grill hood is in an open state.

FIG. 17 shows the conventional grill hood (firebox) of FIG. 2 with the auxiliary handle assembly of FIG. 16, wherein the grill hood 38 is in an open state. As illustrated in FIG. 17, the grill hood 38 is rotated, by the user engaging the auxiliary handle member 710, upon hinges or rotatable attachment mechanisms 51 to reach an open state, thereby allowing the user access to the firebox base 50 and any items that may be located upon grill 52.

As further illustrated in FIG. 17, the opened firebox defines a width C that has a first outer periphery A and a second outer periphery B.

It is noted that the highest risk of serious burns occur when a user is engaged in activity that requires a portion of the user's body to cross over the width (C) of the firebox base 50, the width (C) of the firebox base 50 being defined as the area between the first outer periphery A and the second outer periphery B.

However, since the user engages the auxiliary handle member 710, with respect to the embodiment of FIG. 17, the risk of serious burns is eliminated or substantially reduced because when a user is engaged in the opening (or closing) activity the user's body (or portions thereof) does not need to cross over the width (C) of the firebox base 50, the width (C) of the firebox base 50 being defined as the area between the first outer periphery A and the second outer periphery B, because the auxiliary handle member 710 is located outside the width (C) of the firebox base 50.

In other words, since the auxiliary handle member 610 is located in the area outside of the width (C) of the firebox base 50, being defined as the area not between the first outer periphery A and the second outer periphery B, when a user is engaged in the opening (or closing) activity the user's body (or portions thereof) does not need to cross over the width (C) of the firebox base 50.

Figure 18:
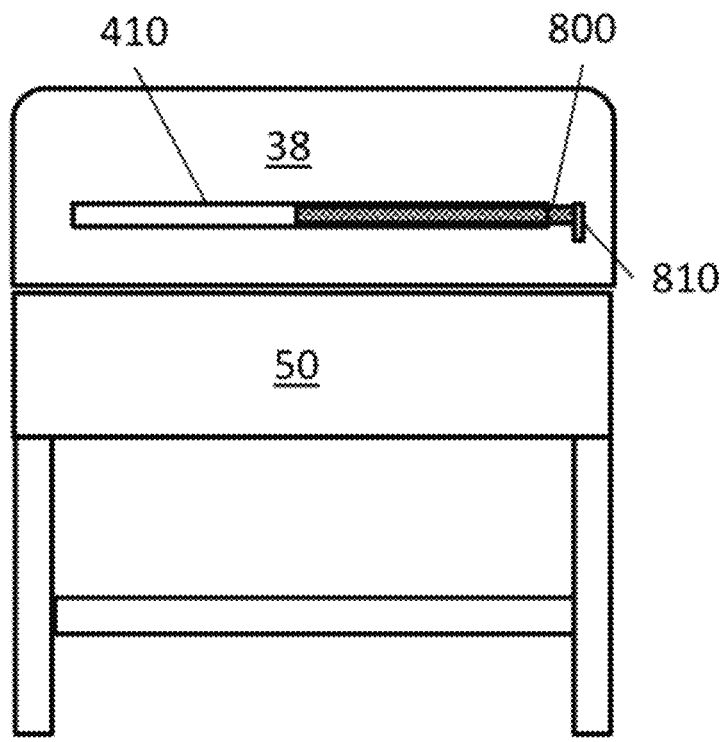
FIG. 18 illustrates an example of a retractable handle for a grill hood.

FIG. 18 illustrates an example of a retractable handle for a grill hood. As illustrated in FIG. 18, a grill hood 38 includes a handle having a stationary handle member 410 and a retractable handle member 800. A portion of the retractable handle member 800 is located in the stationary handle member 410, wherein the stationary handle member 410 is hollow so that the retractable handle member 800 can be readily located within the stationary handle member 410 when in a retracted state.

Figure 19:
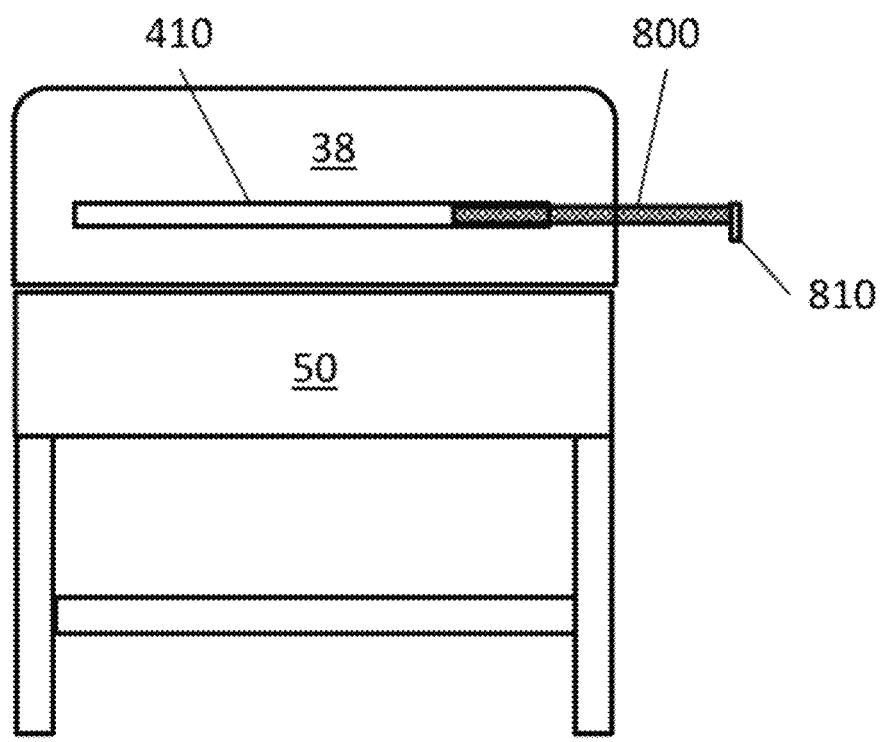
FIG. 19 illustrates the example of FIG. 18 wherein the retractable handle is extended.

The retractable handle member 800 also includes an engagement member 810 that allows a user to interact with the retractable handle member 800 so that the user can retract the retractable handle member 800 within the stationary handle member 410 or extend the retractable handle member 800 from the stationary handle member 410, as illustrated in FIG. 19. The engagement member 810 can also be shaped or configured to prevent the retractable handle member 800 from completely retracting into the stationary handle member 410 such that a user can properly engage the retractable handle member 800 to extend the retractable handle member 800.

As illustrated in FIG. 19, the retractable handle member 800 is extended from the stationary handle member 410 such that a portion of the retractable handle member 800 remains within the stationary handle member 410 to allow the user the ability to open the grill hood 38, but the retractable handle member 800 is extended far enough so that when a user is engaged in the opening (or closing) activity with respect to the grill hood 38, the user's body (or portions thereof) does not need to cross over the width of the firebox 50.

Figure 20:
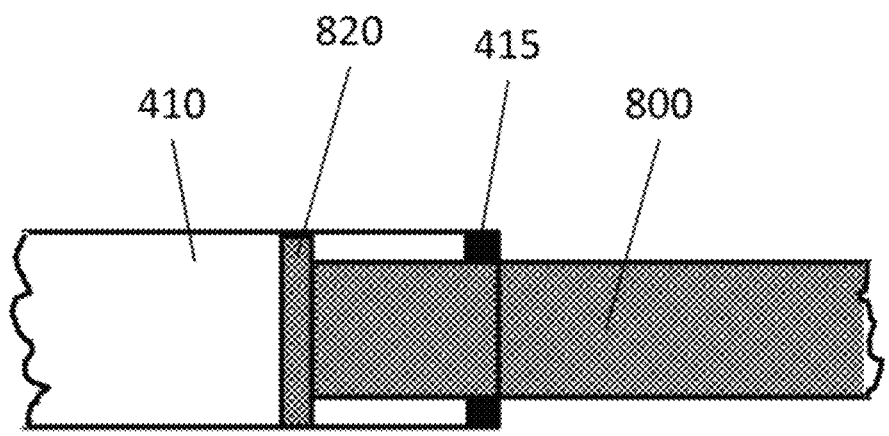
FIG. 20 illustrates an example of an interface between the retractable handle portion of the retractable handle of FIG. 18 and a stationary handle portion of the retractable handle of FIG. 18.

FIG. 20 illustrates an example of the interface between the stationary handle member 410 and the retractable handle member 800 of FIGS. 18 and 19. As illustrated in FIG. 20, the retractable handle member 800 includes a retractable member handle stop 820 that engages a stationary handle member stop 415 to prevent the retractable handle member 800 from being removed from the stationary handle member 410 when the retractable handle member 800 is being extended.

It is noted that the stationary handle member stop 415 may be configured to be removable from the stationary handle member 410 to allow the user to remove the retractable handle member 800 when desired.

It is further noted that the retractable handle member 800 may not include the retractable member handle stop 820 or the stationary handle member 410 may not include the stationary handle member stop 415 such that the retractable handle member 800 engages the stationary handle member 410 in a more temporary basis.

Figure 21:
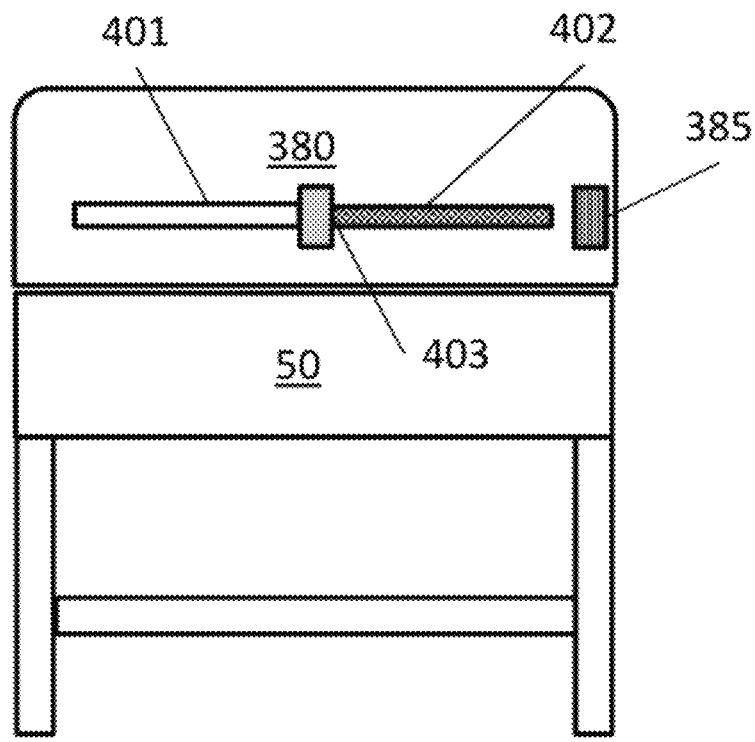
FIG. 21 illustrates an example of a bifurcated rotatable handle for a grill hood.

FIG. 21 illustrates an example of a bifurcated rotatable handle for a grill hood. As illustrated in FIG. 21, a grill hood 380 includes a bifurcated handle having a stationary first handle member 401 and a rotatable second handle member 402. The stationary first handle member 401 and rotatable second handle member 402 are held together in a conventional position by a releasable attachment mechanism 403.

The releasable attachment mechanism 403 may be a quick release female adapter that is attached to the stationary first handle member 401 and is biased to slide over an end of the rotatable second handle member 402 to secure the stationary first handle member 401 and the rotatable second handle member 402 so that the grill cover 380 can be lifted when the rotatable second handle member 402 is engaged with the stationary first handle member 401.

The releasable attachment mechanism 403 may also be a releasable clamp or pin. The releasable attachment mechanism 403 may be any conventional attachment mechanism that is releasable so that the rotatable second handle member 402 can be disengaged from the stationary first handle member 401 and can be engaged with the stationary first handle member 401.

Figure 22:
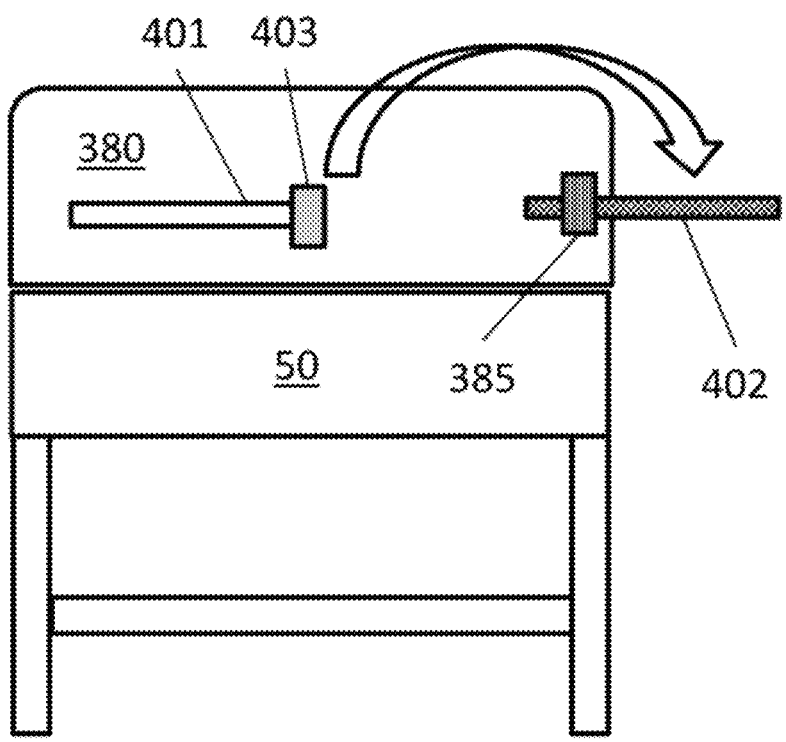
FIG. 22 illustrates the example of FIG. 21 wherein the bifurcated rotatable handle has been rotated for to an extended position.

FIG. 22 illustrates the example of FIG. 21 wherein the rotatable second handle member 402 has been rotated for to an extended position. As illustrated in FIG. 22, the rotatable second handle member 402 has been disengaged from the stationary first handle member 401 and rotated clockwise so that the rotatable second handle member 402 extends beyond a side of the grill cover 380. The rotatable second handle member 402 is held stationary in the extended position by a releasable attachment mechanism 385 located on the grill cover 380.

The releasable attachment mechanism 385 may be any conventional attachment mechanism that is releasable so that the rotatable second handle member 402 can be disengaged from the grill cover 380 and can be engaged with the grill cover 380 when in the extended position.

Since the rotatable second handle member 402 extends into the area outside of the width of a firebox 50, when a user is engaged in the opening (or closing) activity, the user's body (or portions thereof) does not need to cross over the width of the firebox 50, thereby avoiding burns or other injuries.

Figure 23:
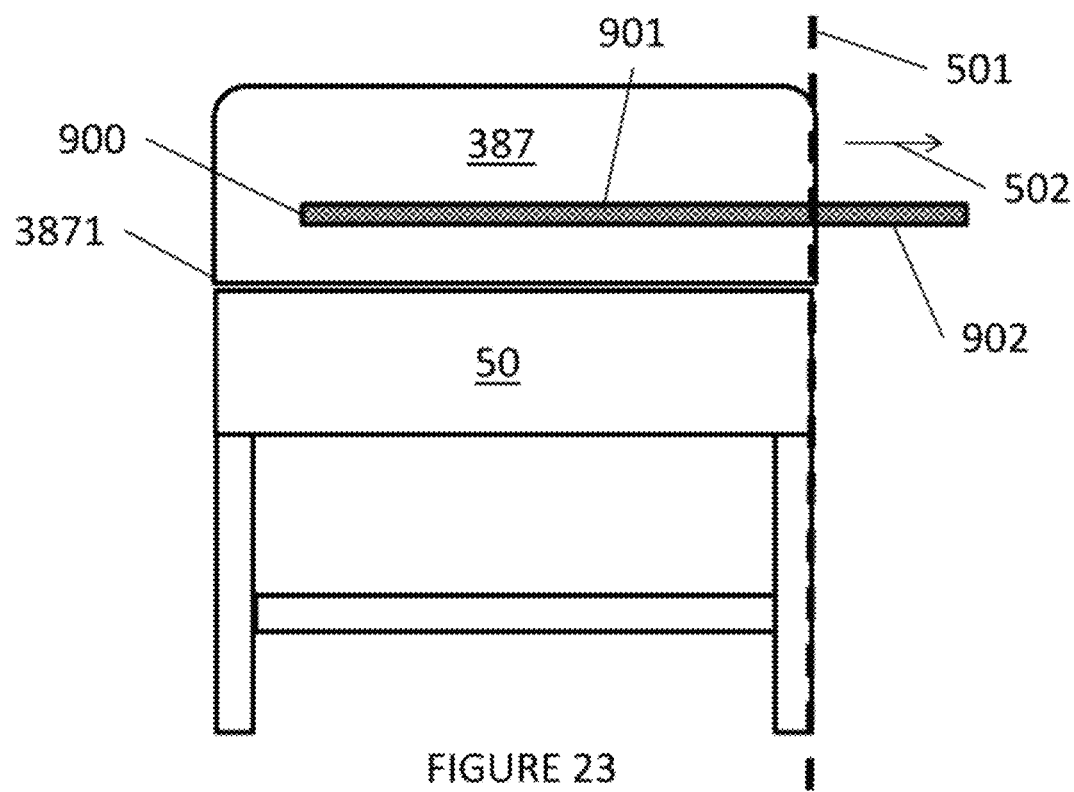
FIG. 23 illustrates an example of an extended handle for a grill hood.

FIG. 23 illustrates an example of an extended handle for a grill hood. As illustrated in FIG. 23, the grill hood 387 includes an extended handle 900 having a face portion 901 and an extended portion 902.

The face portion 901 of the extended handle 900 is positioned similar to a conventional grill hood handle in that face portion 901 runs parallel to a front edge 3871 of the grill hood 387 and across a portion of the face of the grill hood 387.

The extended portion 902 of the extended handle 900 or a portion thereof extends (502) beyond an outer boundary (501) of a firebox 50. More specifically, as illustrated in FIG. 23, extended portion 902 of the extended handle 900 or a portion thereof is extended enough beyond the outer boundary (501) of the firebox 50 to allow the user the ability to open the grill hood 387 without the user's body (or portions thereof) crossing over the width of the firebox 50.

Figure 24:
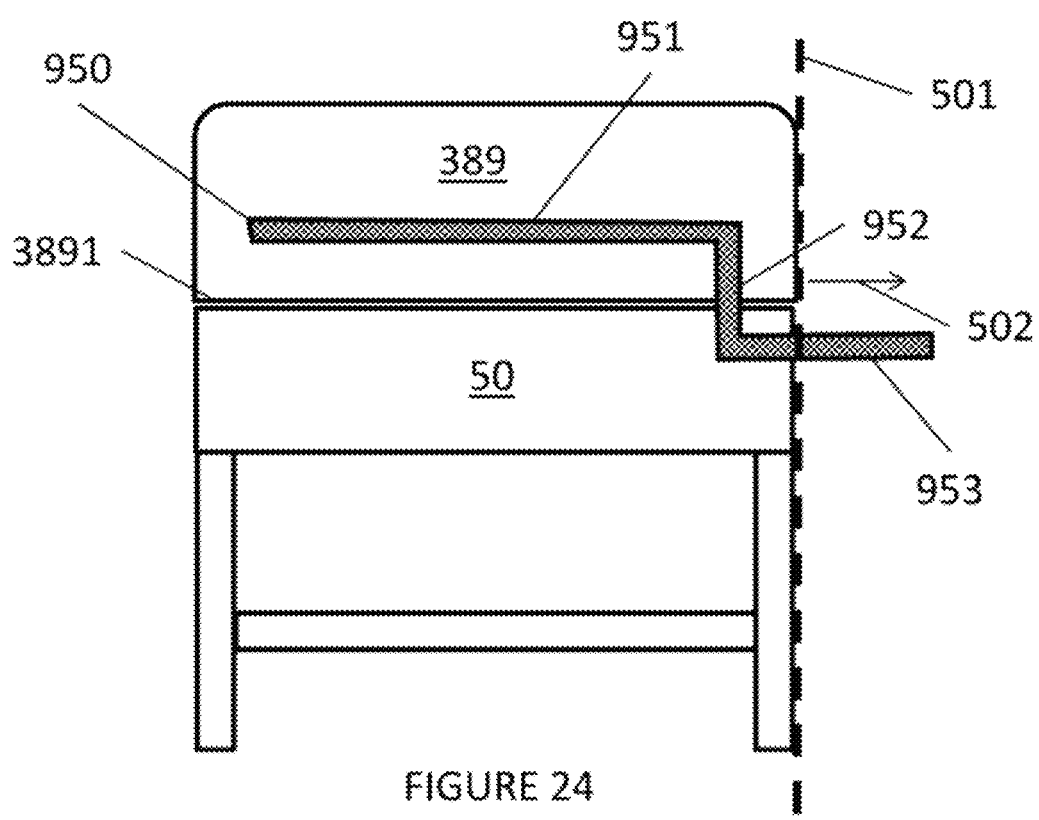
FIG. 24 illustrates another example of an extended handle for a grill hood.

FIG. 24 illustrates another example of an extended handle for a grill hood. As illustrated in FIG. 24, the grill hood 389 includes an extended handle 950 having a face portion 951, a lateral portion 952, and an extended portion 953.

The face portion 951 of the extended handle 950 is positioned similar to a conventional grill hood handle in that face portion 951 runs parallel to a front edge 3891 of the grill hood 389 and across a portion of the face of the grill hood 389.

The lateral portion 952 is substantially perpendicular to the face portion 951. The lateral portion 952 extends downwardly from the face portion 951 to below the front edge 3891 of the grill hood 389.

The length of the lateral portion 952 allows the extended portion 953 to clear any items or activities that may be associated with a wing (not shown) located on the side of the firebox 50. The extended portion 953 of the extended handle 950 or a portion thereof extends (502) beyond an outer boundary (501) of the firebox 50.

More specifically, the extended portion 953 of the extended handle 950 or a portion thereof extends (502) beyond the outer boundary (501) of the firebox 50 on a same side of the grill hood 389 as the lateral portion 952.

For example, if the lateral portion 952 is on the right side of the grill hood 389, the extended portion 953 of the extended handle 950 or a portion thereof extends (502) beyond the right side outer boundary (501) of the firebox 50.

On the other hand, if the lateral portion 952 is on the left side of the grill hood 389, the extended portion 953 of the extended handle 950 or a portion thereof extends (502) beyond the left side outer boundary (501) of the firebox 50.

Moreover, as illustrated in FIG. 24, the extended portion 953 of the extended handle 950 or a portion thereof is extended enough beyond the outer boundary (501) of the firebox 50 to allow the user the ability to open the grill hood 389 without the user's body (or portions thereof) crossing over the width of the firebox 50 as well as clear any items or activities that may be associated with the wing (not shown) located on the side of the firebox 50 due to the lateral portion 952.

Figure 25:
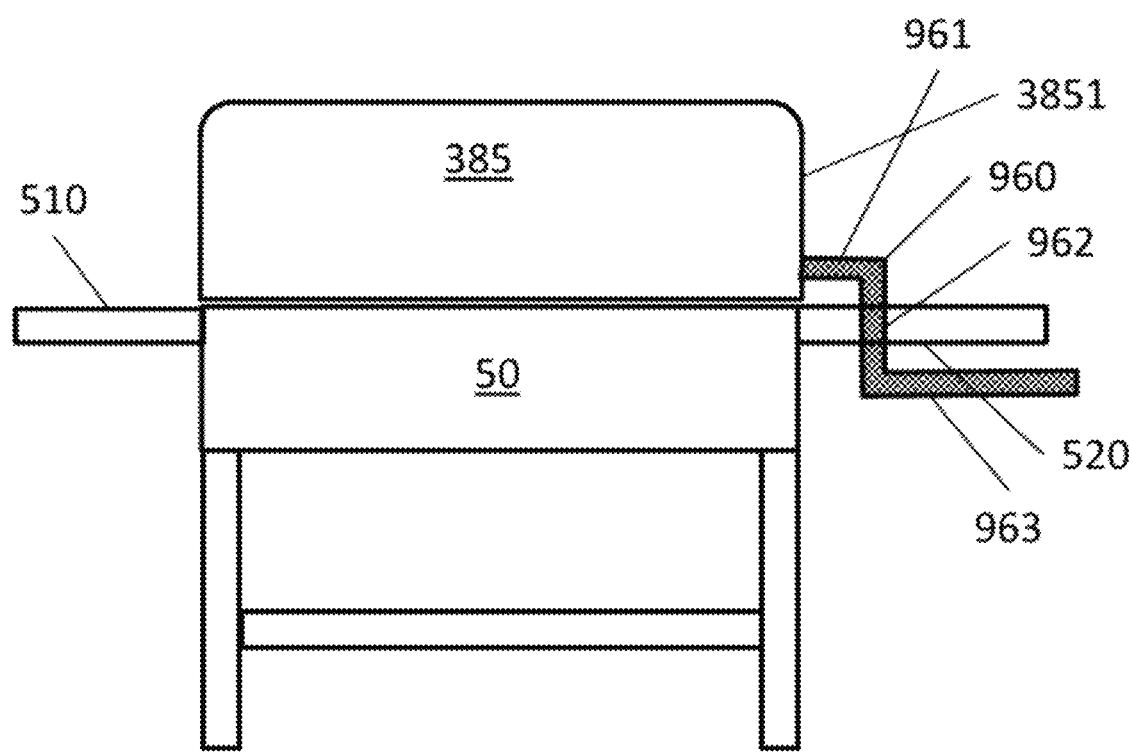
FIG. 25 illustrates an example of an extended side handle for a grill hood.

FIG. 25 illustrates another example of an extended side handle for a grill hood. As illustrated in FIG. 25, the grill hood 385 includes an extended side handle 960 having a first extension portion 961, a lateral portion 962, and a second extension portion 963.

The first extension portion 961 of the extended side handle 960 is positioned to be connected to a side 3851 of the grill hood 385, wherein the side 3851 of the grill hood 385 is substantially perpendicular to a front face of the grill hood 385.

The lateral portion 962 is substantially perpendicular to the first extension portion 961. The lateral portion 962 extends downwardly from the first extension portion 961 to below a front edge (front edge 3891 of FIG. 24) of the grill hood 385. The length of the lateral portion 962 allows the second extension portion 963 to clear any items or activities that may be associated with a wing 520 located on the side of the firebox 50. The second extension portion 963 of the extended side handle 960 extends beyond an outer boundary of the firebox 50.

Moreover, as illustrated in FIG. 25, the second extension portion 963 of the extended side handle 960 is extended enough beyond the outer boundary of the firebox 50 to allow the user the ability to open the grill hood 385 without the user's body (or portions thereof) crossing over the width of the firebox 50 as well as clear any items or activities that may be associated with the wing 520 located on the side of the firebox 50 due to the lateral portion 962.

Figure 26:
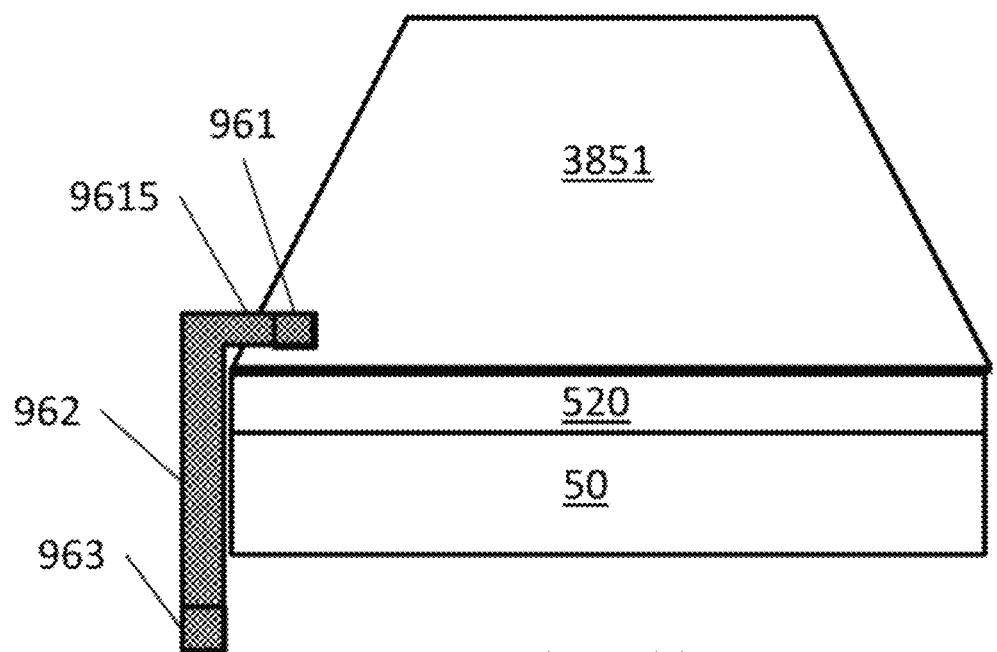
FIG. 26 illustrates an embodiment of an extended side handle for a grill hood.

FIG. 26 illustrates an embodiment of the extended side handle of FIG. 25. As illustrated in FIG. 26, the wing 520 has a width equal to the width of the firebox 50. In this embodiment, the extended side handle has a first extension portion 961, a projection portion 9615, a lateral portion 962, and a second extension portion 963.

The first extension portion 961 of the extended side handle is positioned to be connected to a side 3851 of the grill hood, wherein the side 3851 of the grill hood is substantially perpendicular to a front face of the grill hood.

The projection portion 9615 is substantially perpendicular to the first extension portion 961. The projection portion 9615 is substantially parallel to a surface of wing 520, substantially parallel to the side 3851 of the grill hood, and substantially perpendicular to a front face of the grill hood. The projection portion 9615 has a length to enable the extended side handle to clear a front face of the wing 520.

The lateral portion 962 is substantially perpendicular to the projection portion 9615. The lateral portion 962 extends downwardly from the projection portion 9615 to below a front edge (front edge 3891 of FIG. 24) of the grill hood. The length of the lateral portion 962 allows the second extension portion 963 to clear any items or activities that may be associated with a wing 520 located on the side of the firebox 50. The second extension portion 963 of the extended side handle 960 extends beyond an outer boundary of the firebox 50.

Moreover, as illustrated in FIG. 26, the second extension portion 963 of the extended side handle is extended enough beyond the outer boundary of the firebox 50 to allow the user the ability to open the grill hood without the user's body (or portions thereof) crossing over the width of the firebox 50 as well as clear any items or activities that may be associated with the wing 520 located on the side of the firebox 50 due to the lateral portion 962.

Figure 27:
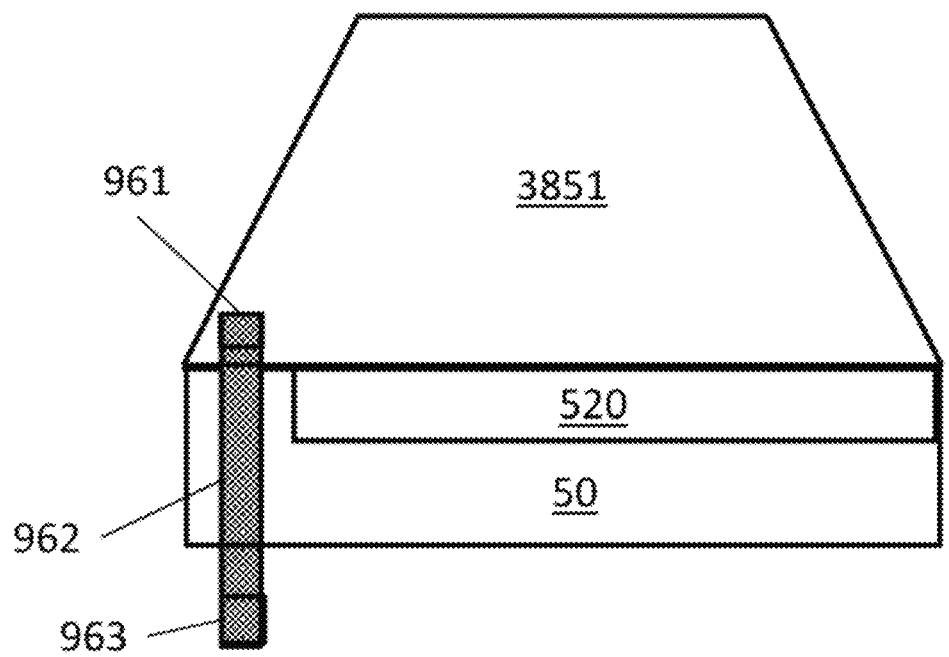
FIG. 27 illustrates another embodiment of an extended side handle for a grill hood.

FIG. 27 illustrates another embodiment of the extended side handle of FIG. 25. As illustrated in FIG. 27, the wing 520 has a width that is not equal to the width of the firebox 50. In this embodiment, the extended side handle has a first extension portion 961, a lateral portion 962, and a second extension portion 963.

The first extension portion 961 of the extended side handle is positioned to be connected to a side 3851 of the grill hood, wherein the side 3851 of the grill hood is substantially perpendicular to a front face of the grill hood.

The lateral portion 962 is substantially perpendicular to the first extension portion 961. The lateral portion 962 extends downwardly from the first extension portion 961 to below a front edge (front edge 3891 of FIG. 24) of the grill hood. The length of the lateral portion 962 allows the second extension portion 963 to clear any items or activities that may be associated with a wing 520 located on the side of the firebox 50. The second extension portion 963 of the extended side handle 960 extends beyond an outer boundary of the firebox 50.

Moreover, as illustrated in FIG. 27, the second extension portion 963 of the extended side handle is extended enough beyond the outer boundary of the firebox 50 to allow the user the ability to open the grill hood without the user's body (or portions thereof) crossing over the width of the firebox 50 as well as clear any items or activities that may be associated with the wing 520 located on the side of the firebox 50 due to the lateral portion 962.

Figure 28:
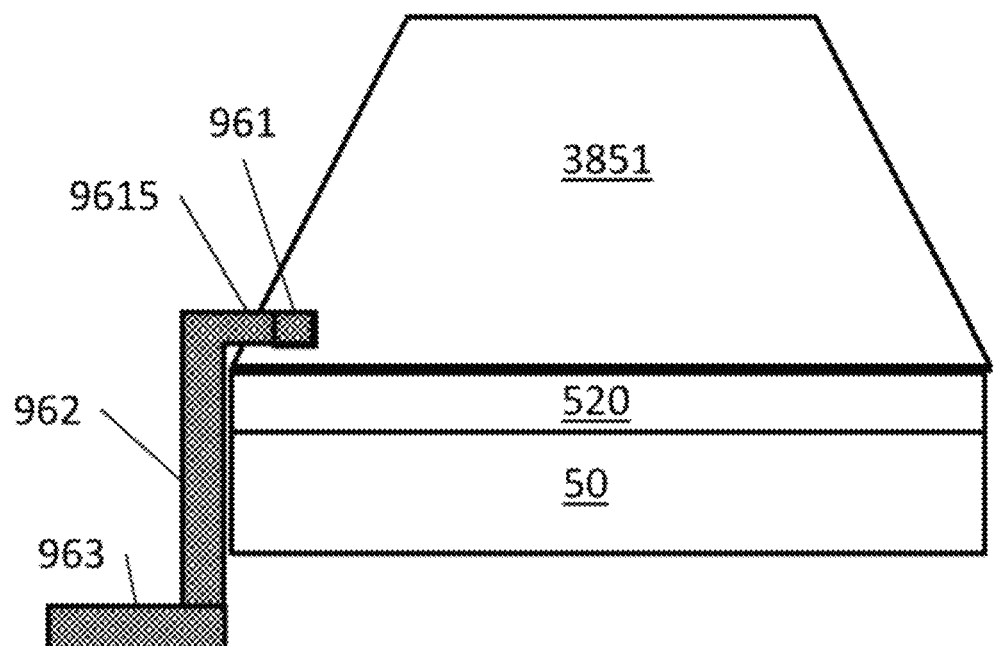
FIG. 28 illustrates another embodiment of an extended side handle for a grill hood.

FIG. 28 illustrates another embodiment of the extended side handle of FIG. 25. As illustrated in FIG. 28, the wing 520 has a width equal to the width of the firebox 50. In this embodiment, the extended side handle has a first extension portion 961, a projection portion 9615, a lateral portion 962, and a second extension portion 963.

The first extension portion 961 of the extended side handle is positioned to be connected to a side 3851 of the grill hood, wherein the side 3851 of the grill hood is substantially perpendicular to a front face of the grill hood.

The projection portion 9615 is substantially perpendicular to the first extension portion 961. The projection portion 9615 is substantially parallel to a surface of wing 520, substantially parallel to the side 3851 of the grill hood, and substantially perpendicular to a front face of the grill hood. The projection portion 9615 has a length to enable the extended side handle to clear a front face of the wing 520.

The lateral portion 962 is substantially perpendicular to the projection portion 9615. The lateral portion 962 extends downwardly from the projection portion 9615 to below a front edge (front edge 3891 of FIG. 24) of the grill hood. The length of the lateral portion 962 allows the second extension portion 963 to clear any items or activities that may be associated with a wing 520 located on the side of the firebox 50.

The second extension portion 963 of the extended side handle 960 is located outside an outer boundary of the firebox 50. In addition, the second extension portion 963 of the extended side handle 960 is substantially perpendicular to lateral portion 962 and extends outwardly from the front face of the grill hood.

Moreover, as illustrated in FIG. 28, the second extension portion 963 of the extended side handle is located outside the outer boundary of the firebox 50 to allow the user the ability to open the grill hood without the user's body (or portions thereof) crossing over the width of the firebox 50 as well as clear any items or activities that may be associated with the wing 520 located on the side of the firebox 50 due to the lateral portion 962.

Figure 29:
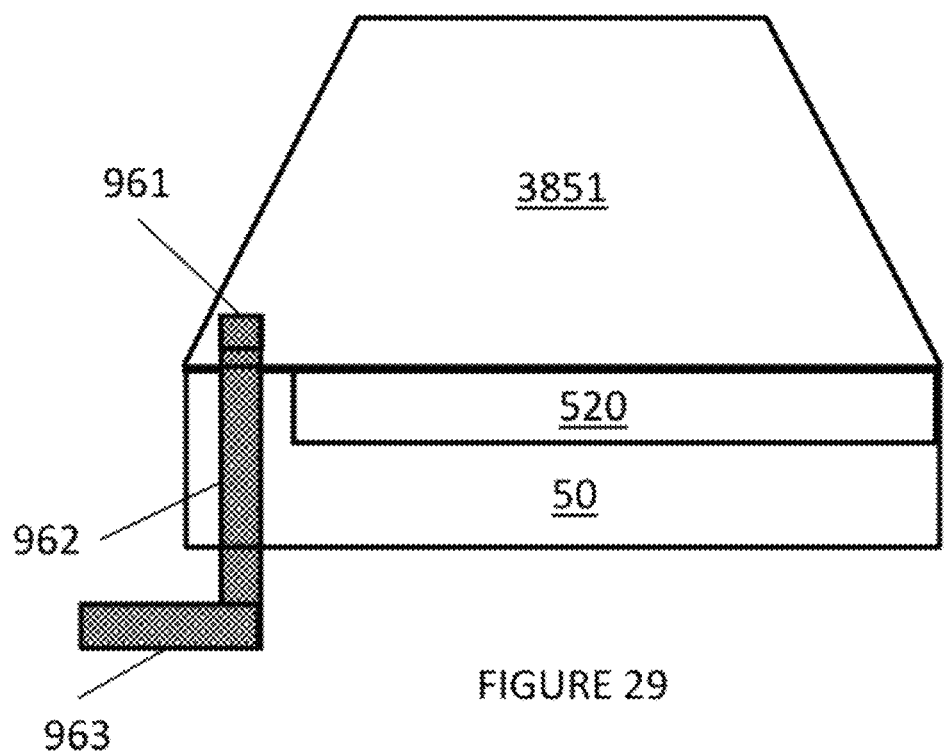
FIG. 29 illustrates another embodiment of an extended side handle for a grill hood.

FIG. 29 illustrates another embodiment of the extended side handle of FIG. 25. As illustrated in FIG. 29, the wing 520 has a width that is not equal to the width of the firebox 50. In this embodiment, the extended side handle has a first extension portion 961, a lateral portion 962, and a second extension portion 963.

The first extension portion 961 of the extended side handle is positioned to be connected to a side 3851 of the grill hood, wherein the side 3851 of the grill hood is substantially perpendicular to a front face of the grill hood.

The lateral portion 962 is substantially perpendicular to the first extension portion 961. The lateral portion 962 extends downwardly from the first extension portion 961 to below a front edge (front edge 3891 of FIG. 24) of the grill hood.

The length of the lateral portion 962 allows the second extension portion 963 to clear any items or activities that may be associated with a wing 520 located on the side of the firebox 50. The second extension portion 963 of the extended side handle 960 is located outside an outer boundary of the firebox 50. In addition, the second extension portion 963 of the extended side handle 960 is substantially perpendicular to lateral portion 962 and extends outwardly from the front face of the grill hood.

Moreover, as illustrated in FIG. 29, the second extension portion 963 of the extended side handle is located outside the outer boundary of the firebox 50 to allow the user the ability to open the grill hood without the user's body (or portions thereof) crossing over the width of the firebox 50 as well as clear any items or activities that may be associated with the wing 520 located on the side of the firebox 50 due to the lateral portion 962.

Figure 30:
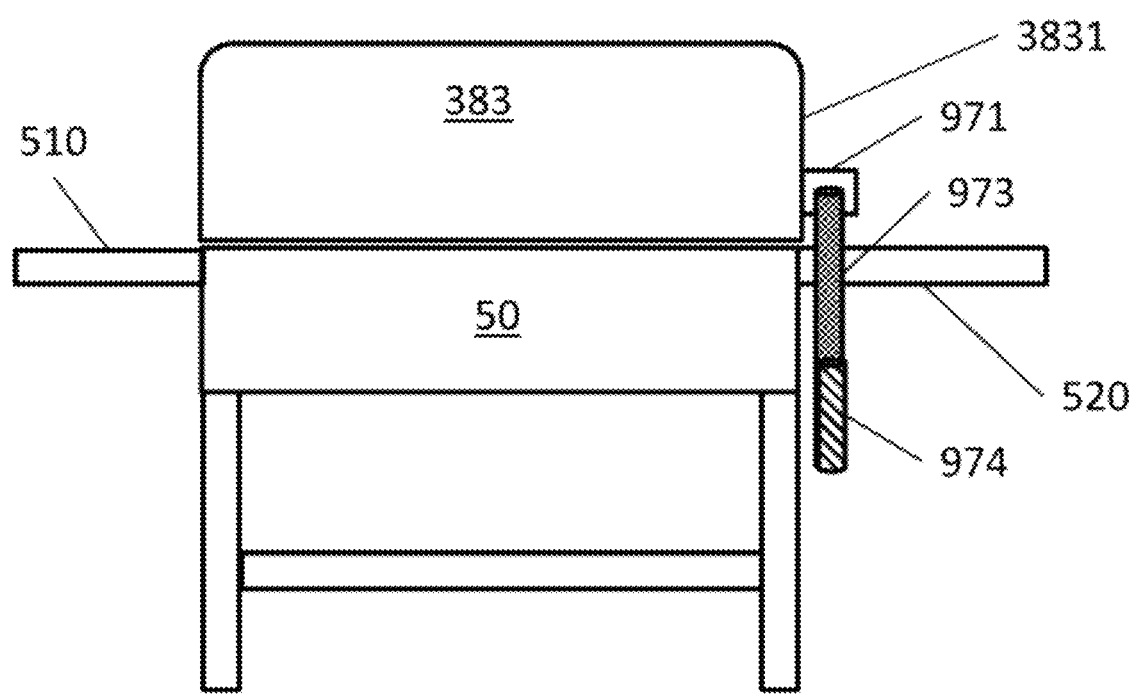
FIG. 30 illustrates another embodiment of an extended side handle for a grill hood.

FIG. 30 illustrates another example of an extended side handle assembly for a grill hood. As illustrated in FIG. 30, the grill hood 383 includes an extended side handle assembly having a securing member 971, an extension portion 973, a rotatable shaft (not shown), and an optional handle 974.

The securing member 971 is rotatably connected to the rotatable shaft to secure the extended side handle to a side 3831 of the grill hood 383, wherein the side 3831 of the grill hood 383 is substantially perpendicular to a front face of the grill hood 383.

The extension portion 973 is substantially perpendicular to the rotatable shaft. The extension portion 973 extends downwardly from the rotatable shaft to below a front edge (front edge 3891 of FIG. 24) of the grill hood 383. The length of the extension portion 973 allows, when in a lifting position (extension portion 973 being rotated from a position substantially perpendicular to the ground to a position substantially parallel to the ground), the extended side handle to clear an outer boundary of the firebox 50.

Figure 31:
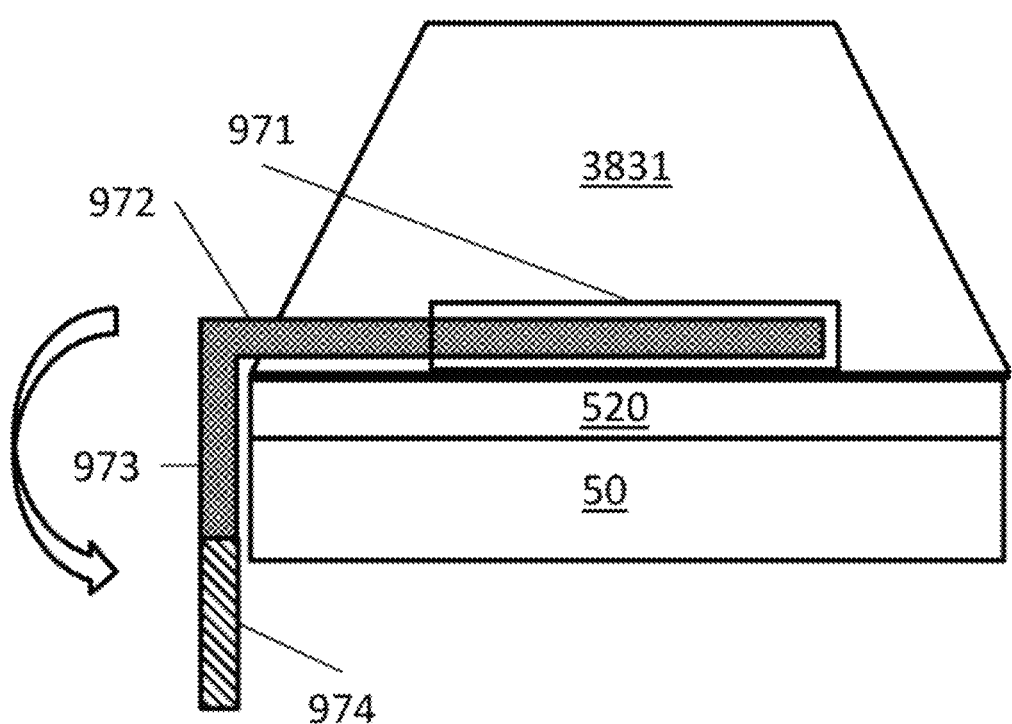
FIG. 31 illustrates a side view of the embodiment of FIG. 30 with the extended side handle in a stored state.

As illustrated in FIG. 31, the extended side handle assembly has a securing member 971, an extension portion 973, a rotatable shaft 972, and an optional handle 974. The securing member 971 is rotatably connected to the rotatable shaft 972 to secure the extended side handle to a side 3831 of the grill hood 383, wherein the side 3831 of the grill hood 383 is substantially perpendicular to a front face of the grill hood 383.

The securing member 971 may include a stop (not shown) to limit the rotation of the rotatable shaft 972. Preferably the securing member 971 may include two stops (not shown) to limit the rotation of the rotatable shaft 972 to between a storing position (extension portion 973 being in a position substantially perpendicular to the ground) and a lifting position (extension portion 973 being in a position substantially parallel to the ground), which may have a total 90 degrees therebetween.

It is noted that the rotatable shaft 972 may extend out beyond the front face of the grill hood 383 so that extension portion 973 may clear, when lifting the grill hood 383 (extension portion 973 being rotated from a position substantially perpendicular to the ground to a position substantially parallel to the ground and then lifting the extension portion 973 to rotate the grill hood 383 to an open position), any items or activities that may be associated with the wing 520 located on the side of the firebox 50.

Figure 32:
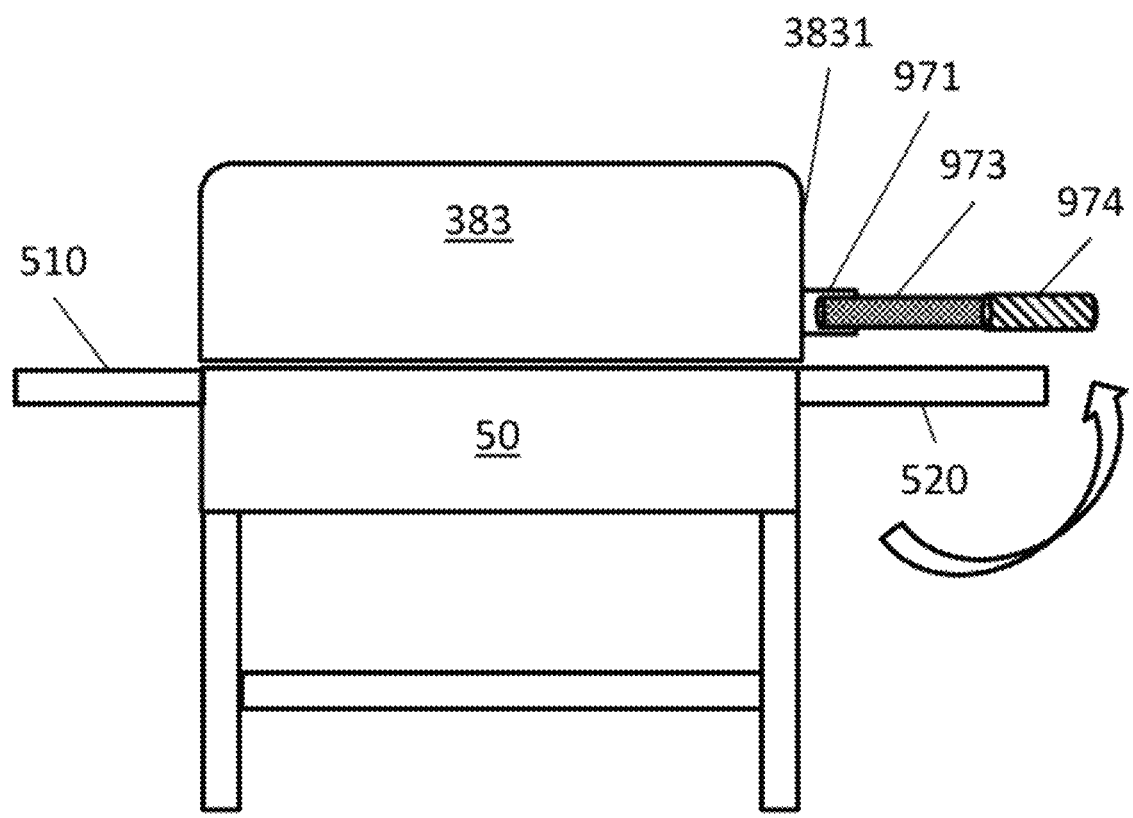
FIG. 32 illustrates a front view of the embodiment of FIG. 30 with the extended side handle in a lifting state.

Moreover, as illustrated in FIG. 32, the extension portion 973, when in a lifting position (extension portion 973 being in a position substantially parallel to the ground), is extended enough beyond the outer boundary of the firebox 50 to allow the user the ability to open the grill hood 383 without the user's body (or portions thereof) crossing over the width of the firebox 50.

It is noted that all the handles, described above, or portions thereof are connected to the grill hood hinged to a firebox by projections that keep the handles an operationally safe distance from the grill hood hinged to a firebox. In other words, the portion of the handles being engaged by the user (griller) is not in direct contact with the grill hood hinged to a firebox.

It is noted that the various embodiments of the handle, described above, are not limited to any particular grill type. For example, the various embodiments of the handle, described above, may be applicable to a natural gas burning grill, a propane burning grill, a wood burning grill, a charcoal burning grill, a pellet burning grill, etc., wherein the grill hood is hinged to a firebox.

It is further noted that various embodiments of the handle, described above, are not limited to any particular shape. For example, the shape of the handle may be curved so long as the portion that the user engages to open or close the grill hood hinged to the firebox is outside the width of the firebox, as described above, thereby not requiring the user's body (or portions thereof) to cross over the width of the firebox base when a user is engaged in the opening (or closing) activity with respect to the grill hood hinged to the firebox.

A handle assembly for a grill hood hinged to a firebox includes a handle member; a stopping member operatively connected to said handle member; and a lift member operatively connected to said stopping member; the stopping member and the lift member being configured to engage an opening located at a bottom edge on a side of the grill hood; the lift member being configured to be insertable into the opening located at the bottom edge on the side of the grill hood; the stopping member being configured to be engaged with the side of the grill hood when the lift member is inserted in the opening located at the bottom edge on the side of the grill hood.

The stopping member may have a dimension greater than a dimension of the opening located at the bottom edge on the side of the grill hood such that the stopping member is prevented from being into the opening located at the bottom edge on the side of the grill hood when the lift member is inserted in the opening located at the bottom edge on the side of the grill hood.

The lift member may be orthogonal to the stopping member. The lift member may be non-orthogonal to the stopping member. The stopping member may include a magnet.

An auxiliary handle assembly for a handle of a grill hood hinged to a firebox includes an auxiliary handle member; and an auxiliary handle extension member operatively connected to the auxiliary handle member; the auxiliary handle extension member including an auxiliary handle extension channel for receiving, therein, the handle of the grill hood.

The auxiliary handle extension member may have a dimension such that the auxiliary handle member extends beyond a side of the grill hood when the auxiliary handle extension channel receives, therein, the handle of the grill hood.

An auxiliary handle assembly for a handle of a grill hood hinged to a firebox includes an auxiliary handle member; an auxiliary handle extension member operatively connected to the auxiliary handle member; a first orthogonal grip operatively connected to the auxiliary handle extension member; and a second orthogonal grip operatively connected to the auxiliary handle extension member; the auxiliary handle extension member, the first orthogonal grip, and the second orthogonal grip configured to engage a projecting member on the grill hood, the projecting member maintaining the handle at a predetermined distance from a face of the grill hood.

A position of the first orthogonal grip on the auxiliary handle extension member may be static and a position of the second orthogonal grip on the auxiliary handle extension member may be dynamic such that the position of the second orthogonal grip is biased towards the position of the first orthogonal grip.

The auxiliary handle assembly may include a switch to move the second orthogonal grip on the auxiliary handle extension member away from the first orthogonal grip on the auxiliary handle extension member to enable the auxiliary handle extension member, the first orthogonal grip, and the second orthogonal grip to engage the projecting member on the grill hood.

A position of the second orthogonal grip on the auxiliary handle extension member may be static and a position of the first orthogonal grip on the auxiliary handle extension member may be dynamic such that the position of the first orthogonal grip is biased towards the position of the second orthogonal grip.

The auxiliary handle assembly may include a switch to move the first orthogonal grip on the auxiliary handle extension member away from the second orthogonal grip on the auxiliary handle extension member to enable the auxiliary handle extension member, the first orthogonal grip, and the second orthogonal grip to engage the projecting member on the grill hood.

A retractable handle assembly for a grill hood hinged to a firebox includes a stationary handle member operatively connected to the grill hood; and a retractable handle member operatively connected to the stationary handle member; the retractable handle member, when in an extended state, being extended from the stationary handle member such that a portion of the retractable handle member extends beyond an outer boundary of the firebox.

The retractable handle member, when in a retracted state, is positioned such that no portion of the retractable handle member extends beyond the outer boundary of the firebox. The stationary handle member includes a channel such that a portion of the retractable handle member is located within the channel of the stationary handle member. The stationary handle member includes a stationary handle member stop and the retractable handle member includes a retractable handle member stop; the stationary handle member stop and the retractable handle member stop preventing the retractable handle member from being disengaged from the stationary handle member.

A rotatable handle assembly for a grill hood hinged to a firebox includes a stationary handle member, operatively connected to the grill hood, having a first stationary handle member end and a second stationary handle member end; a rotatable handle member having a first rotatable handle member end and a second rotatable handle member end; and a stationary handle attachment mechanism to detachably attach the second stationary handle member end to the first rotatable handle member end; the first rotatable handle member end, when the rotatable handle member is in a first state, being attached to the second stationary handle member end; the first rotatable handle member end, when the rotatable handle member is in a second state, being positioned beyond an outer boundary of the firebox.

The rotatable handle assembly may include a rotatable handle attachment mechanism to detachably attach, when the rotatable handle member is in the second state, the rotatable handle member to the grill hood.

A handle assembly for a grill hood hinged to a firebox includes an extended grill handle having a face portion and an extended portion; the face portion being positioned to be parallel to a front edge of the grill hood and across a portion of a face of the grill hood; the extended portion extending beyond an outer boundary of the firebox.

A handle assembly for a grill hood hinged to a firebox includes an extended grill handle having a face portion, a lateral portion, and an extended portion; the face portion being positioned to be parallel to a front edge of the grill hood and across a portion of a face of the grill hood; the lateral portion being substantially perpendicular to the face portion and extending downwardly from the face portion to below the front edge of the grill hood; the extended portion being substantially perpendicular to the lateral portion and extending beyond an outer boundary of the firebox.

A handle assembly for a grill hood hinged to a firebox includes an extended grill handle having a rotatable portion and an extension portion; and an attachment mechanism located on a first side of the grill hood, the first side of the grill hood being substantially perpendicular to a second side of the grill hood, the second side of the grill hood being hinged to the firebox; the rotatable portion being rotatably connected to the attachment mechanism; the extension portion being substantially perpendicular to the rotatable portion; the extension portion being parallel to a surface of the first side of the grill hood when in a stored position; the extended portion being substantially perpendicular to the surface of the first side of the grill hood when in a lifting position.

The rotation of the rotatable portion may be limited to 90°. The handle assembly may further include a stop to limit rotation of the rotatable portion to 90°. The extended grill handle may include a handle portion on the extension portion.

It will be appreciated that several of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above.

What is claimed is:

1. A handle assembly for a grill hood having a face, a front edge and a back edge, the back edge being hinged to a firebox, the firebox having an outer periphery, comprising:
    an extended grill handle having a face portion, a lateral portion, and an extended portion;
    said face portion being positioned to be parallel to the front edge of the grill hood and across a portion of the face of the grill hood;
    said face portion having a first face portion end and a second face portion end;
    said lateral portion having a first lateral portion end and a second lateral portion end;
    said extended portion having a first extended portion end and a second extended portion end;
    said second face portion end being configured to connect substantially perpendicular to said first lateral portion end;
    said second lateral portion end being configured to connect substantially perpendicular to said first extended portion end;
    said extended portion having a portion including said second extended portion end;
    said portion of said extended portion being located outside the outer periphery of the firebox;
    said lateral portion being located inside the outer periphery of the firebox;
    said lateral portion being substantially perpendicular to said face portion and extending downwardly from said second face portion end to below the front edge of the grill hood;
    said extended portion being substantially perpendicular to said lateral portion;
    said portion of said extended portion not crossing over the firebox when the grill hood is opened.

2. The handle assembly, claimed in claim 1, wherein said extended portion extends in a direction parallel to the front edge of the grill hood.

3. A handle assembly for a grill hood hinged to a firebox having an outer periphery, comprising:
    an integral extended grill handle having a first extension portion, a lateral portion, and a second extension portion;
    said integral extended grill handle being located outside the outer periphery of the firebox;
    said integral extended grill handle not crossing over the firebox when the grill hood is opened;
    said first extension portion being configured to attach to a side of the grill hood, the side of the grill hood being substantially perpendicular to a front face of the grill hood, said first extension portion being substantially orthogonal to the side of the grill hood;
    said lateral portion being substantially perpendicular to said first extension portion and extending downwardly from said first extension portion to below a front face edge of the grill hood;
    said second extension portion being substantially perpendicular to said lateral portion;
    said second extension portion being substantially parallel to the side of the grill hood;
    said second extension portion not being configured to attach to the side of the grill hood;
    said extended grill handle further including a projection portion;
    said projection portion being substantially perpendicular to said first extension portion and extending towards front face of the grill hood;
    said lateral portion being substantially perpendicular to said projection portion and extending downwardly from said projection portion to below a front face edge of the grill hood;
    said projection portion being substantially parallel to the side of the grill hood.

4. A handle assembly for a grill hood hinged to a firebox having an outer periphery, comprising:
    an integral extended grill handle having a first extension portion, a lateral portion, and a second extension portion;

said integral extended grill handle being located outside the outer periphery of the firebox;

said integral extended grill handle not crossing over the firebox when the grill hood is opened;

said first extension portion being configured to attach to a side of the grill hood, the side of the grill hood being substantially perpendicular to a front face of the grill hood, said first extension portion being substantially orthogonal to the side of the grill hood;

said lateral portion being substantially perpendicular to said first extension portion and extending downwardly from said first extension portion to below a front face edge of the grill hood;

said second extension portion being substantially perpendicular to said lateral portion;

said second extension portion being substantially perpendicular to the side of the grill hood;

said second extension portion not being configured to attach to the side of the grill hood;

said extended grill handle further including a projection portion;

said projection portion being substantially perpendicular to said first extension portion and extending towards front face of the grill hood;

said lateral portion being substantially perpendicular to said projection portion and extending downwardly from said projection portion to below a front face edge of the grill hood;

said projection portion being substantially parallel to the side of the grill hood.

* * * * *